(12) United States Patent
Cho et al.

(10) Patent No.: US 12,487,322 B2
(45) Date of Patent: Dec. 2, 2025

(54) DEVICE AND METHOD WITH RADAR SIGNAL PROCESSING

(71) Applicant: SAMSUNG ELECTRONICS CO., LTD., Suwon-si (KR)

(72) Inventors: Hyunwoong Cho, Suwon-si (KR); Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 17/976,162

(22) Filed: Oct. 28, 2022

(65) Prior Publication Data

US 2023/0228840 A1 Jul. 20, 2023

(30) Foreign Application Priority Data

Jan. 19, 2022 (KR) ................ 10-2022-0007879

(51) Int. Cl.
*G01S 7/02* (2006.01)
*G01S 7/28* (2006.01)
*G01S 7/282* (2006.01)

(52) U.S. Cl.
CPC .............. *G01S 7/023* (2013.01); *G01S 7/282* (2013.01)

(58) Field of Classification Search
CPC . G01S 7/023; G01S 7/282; G01S 7/42; G01S 2013/0254; G01S 13/584; G01S 13/931; G01S 13/42; G01S 7/02; G01S 7/35; G01S 13/536; G01S 13/878; G01S 2013/9318; G01S 2013/9321; H04B 7/086; H04L 27/103
See application file for complete search history.

(56) References Cited

U.S. PATENT DOCUMENTS 9,739,879 B2   8/2017   Rohling
9,746,554 B2   8/2017   Millar et al.
(Continued)

FOREIGN PATENT DOCUMENTS

CN   110412558 A   11/2019
CN   112764020 A   5/2021
(Continued)

OTHER PUBLICATIONS

Extended European search report issued on Jun. 27, 2023, in counterpart European Patent Application No. 22207265.4 (7 pages).
(Continued)

*Primary Examiner* — William Kelleher
*Assistant Examiner* — Juliana Cross
(74) *Attorney, Agent, or Firm* — NSIP Law

(57) ABSTRACT

An electronic device includes: a radar sensor configured to radiate a radar signal and receive a reflected signal of the radiated radar signal by: transmitting at least some chirp signals among a plurality of chirp signals belonging to the same frame through a single antenna among a plurality of antennas of the radar sensor; and transmitting other chirp signals among the plurality of chirp signals belonging to the same frame through at least two antennas among the plurality of antennas; and one or more processors configured to detect a target and determine a direction of arrival (DOA) of the target from radar data determined based on the at least some chirp signals, the other chirp signals, and the reflected signal.

19 Claims, 14 Drawing Sheets

(56) References Cited

U.S. PATENT DOCUMENTS

| | | | |
|---|---|---|---|
| 9,835,723 B2 | 12/2017 | Jansen et al. | |
| 10,768,291 B2 | 9/2020 | Hammes et al. | |
| 10,989,801 B2 | 4/2021 | Choi et al. | |
| 11,275,169 B2 | 3/2022 | Choi | |
| 11,592,548 B2* | 2/2023 | Kesaraju | G01S 13/589 |
| 11,693,106 B2* | 7/2023 | Lang | G01S 13/931 |
| | | | 342/109 |
| 11,789,138 B2* | 10/2023 | Chen | G01S 7/352 |
| | | | 342/111 |
| 12,253,624 B2* | 3/2025 | Liu | G01S 13/343 |
| 2012/0146844 A1* | 6/2012 | Stirling-Gallacher | |
| | | | G01S 13/343 |
| | | | 342/189 |
| 2018/0011170 A1* | 1/2018 | Rao | G01S 7/354 |
| 2019/0056478 A1* | 2/2019 | Millar | H04B 1/69 |
| 2020/0150260 A1* | 5/2020 | Lang | G01S 13/42 |
| 2020/0174096 A1 | 6/2020 | Cho et al. | |
| 2021/0156982 A1* | 5/2021 | Stettiner | G01S 7/35 |
| 2021/0199797 A1 | 7/2021 | Choi et al. | |
| 2021/0247508 A1 | 8/2021 | Kim et al. | |
| 2021/0286045 A1 | 9/2021 | Bayesteh et al. | |
| 2021/0333386 A1* | 10/2021 | Park | G01S 7/356 |
| 2022/0155411 A1 | 5/2022 | Choi et al. | |
| 2023/0139751 A1* | 5/2023 | Sanderovich | G01S 13/89 |
| | | | 382/103 |

FOREIGN PATENT DOCUMENTS

| | | | | |
|---|---|---|---|---|
| CN | 112965067 A | 6/2021 | | |
| EP | 2 876 460 A1 | 5/2015 | | |
| EP | 4016116 A1 * | 6/2022 | | B60W 40/02 |
| KR | 10-2019-0025997 A | 3/2019 | | |
| KR | 10-2065052 B1 | 2/2020 | | |
| WO | WO 2015/188987 A1 | 12/2015 | | |
| WO | WO 2021/031076 A1 | 2/2021 | | |

OTHER PUBLICATIONS

Belfiori, Francesco, Wim van Rossum, and Peter Hoogeboom. "Random transmission scheme approach for a FMCW TDMA coherent MIMO radar." 2012 *IEEE Radar Conference*. IEEE, 2012. pp. 0178-0183.

Hu, Xueyao, et al. "A multi-carrier-frequency random-transmission chirp sequence for TDM MIMO automotive radar." *IEEE Transactions on Vehicular Technology* 68.4 (2019): pp. 3672-3685.

* cited by examiner

DEVICE AND METHOD WITH RADAR SIGNAL PROCESSING

CROSS-REFERENCE TO RELATED APPLICATIONS

This application claims the benefit of Korean Patent Application No. 10-2022-0007879, filed on Jan. 19, 2022 in the Korean Intellectual Property Office, the entire disclosure of which is incorporated herein by reference for all purposes.

BACKGROUND

1. Field of the Invention

The following description relates to a device and method with radar signal processing.

2. Description of the Related Art

An advanced driver assistance system (ADAS) may refer to a system that supports driving for the purpose of improving safety and convenience of a driver and avoiding dangerous situations by using sensors mounted inside or outside a vehicle.

Sensors used in the ADAS may include a camera, an infrared (IR) sensor, an ultrasound sensor, a LiDAR, and/or a radar. Here, the radar may reliably measure an object around a vehicle without being affected by a surrounding environment (for example, weather) compared to optic-based sensors.

SUMMARY

This Summary is provided to introduce a selection of concepts in a simplified form that are further described below in the Detailed Description. This Summary is not intended to identify key features or essential features of the claimed subject matter, and is not intended to be used as an aid in determining the scope of the claimed subject matter.

In one general aspect, an electronic device includes: a radar sensor configured to radiate a radar signal and receive a reflected signal of the radiated radar signal by: transmitting at least some chirp signals among a plurality of chirp signals belonging to the same frame through a single antenna among a plurality of antennas of the radar sensor; and transmitting other chirp signals among the plurality of chirp signals belonging to the same frame through at least two antennas among the plurality of antennas; and one or more processors configured to detect a target and determine a direction of arrival (DOA) of the target from radar data determined based on the at least some chirp signals, the other chirp signals, and the reflected signal.

For the transmitting of the other chirp signals, the radar sensor may be configured to transmit each of the other chirp signals in a single chirp sequence within the same frame.

For the transmitting of the other chirp signals, the radar sensor may be configured to transmit a corresponding chirp signal through a transmit antenna randomly determined in a timeslot selected for each of the other chirp signals in a single chirp sequence within the same frame.

The radar sensor may be configured to transmit a chirp signal for multiple input multiple output (MIMO) by activating all the transmit antennas in the same frame at least once.

The radar sensor may be configured to: for the transmitting of the at least some chirp signals, transmit the at least some chirp signals generated based on a first carrier frequency, through the single antenna; and for the transmitting of the other chirp signals, transmit the other chirp signals generated based on a second carrier frequency different from the first carrier frequency, through the at least two antennas.

The radar sensor may be configured to: for the transmitting of the at least some chirp signals, transmit the at least some chirp signals generated based on a first carrier frequency, through the single antenna; and for the transmitting of the other chirp signals, transmit a corresponding chirp signal through a transmit antenna randomly determined in a timeslot randomly selected in a single chirp sequence within the same frame for each of the other chirp signals generated based on a second carrier frequency different from the first carrier frequency.

The one or more processors may be configured to determine a range-Doppler map, comprised in the radar data, based on the at least some chirp signals and reflected signals of the at least some chirp signals.

For the determining of the range-Doppler map, the one or more processors may be configured to determine the range-Doppler map by performing a range-based frequency transform and a Doppler frequency-based frequency transform on intermediate frequency data between the at least some chirp signals and corresponding reflected signals.

For the detecting of the target, the one or more processors may be configured to detect the target based on the range-Doppler map.

The one or more processors may be configured to determine a range profile, comprised in the radar data, based on the other chirp signals and reflected signals of the other chirp signals.

For the determining of the range profile, the one or more processors may be configured to determine the range profile by performing a range-based frequency transform on intermediate frequency data based on the other chirp signals and the reflected signals of the other chirp signals.

The one or more processors may be configured to skip a Doppler frequency-based frequency transform on the other chirp signals.

For the determining of the DOA, the one or more processors may be configured to determine a DOA for each detected target by processing the other chirp signals based on a target that is detected based on a range-Doppler map determined by processing the at least some chirp signals.

The one or more processors may be configured to maintain a range, a Doppler velocity, and an angle for each target detected in each frame.

A ratio of time slots for multiple input multiple output (MIMO) within the same frame may be greater than 0 and less than or equal to 0.5.

Each of a plurality of chirp sequences included in the same frame may include the same number of time slots as a number of transmit antennas included in the radar sensor.

One of the at least two antennas for multiple input multiple output (MIMO) may be the same antenna as the single antenna for single input multiple output (SIMO).

The electronic device may be configured to mount to a vehicle, and the one or more processors may be configured to: generate a surrounding environment map based on radar processing results including any one or any combination of any two or more of a range, a Doppler velocity, and the DOA determined from the radar data; and control either one or both of a steering and a velocity of the vehicle using the generated surrounding environment map.

In another general aspect, a processor-implemented method with radar signal processing includes: transmitting at least some chirp signals among a plurality of chirp signals belonging to the same frame through a single antenna among a plurality of antennas; transmitting other chirp signals among the plurality of chirp signals belonging to the same frame through at least two antennas among the plurality of antennas; and detecting a target and determining a direction of arrival (DOA) of the target from radar data determined based on the at least some chirp signals, the other chirp signals, and a reflected signal.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with radar signal processing includes: transmitting first chirp signals through a single antenna and second chirp signals through two or more antennas, the first and second chirp signals being among a plurality of chirp signals belonging to a same frame; generating first radar data based on a reflected signal corresponding to the first chirp signals; and generating second radar data based on a reflected signal corresponding to the second chirp signals.

The transmitting of the second chirp may include, for each of the second chirp signals, transmitting the second chirp signal through an antenna of the two or more antennas corresponding to a time slot of the chirp signal.

The first chirp signals and the second chirp signals may be generated based on a same carrier frequency.

The first chirp signals may be generated based on a first carrier frequency and the second chirp signals may be generated based on a second carrier frequency different from the first carrier frequency.

The first radar data may include a range-Doppler map and the second radar data may include a range profile.

Other features and aspects will be apparent from the following detailed description, the drawings, and the claims.

Figure 1:
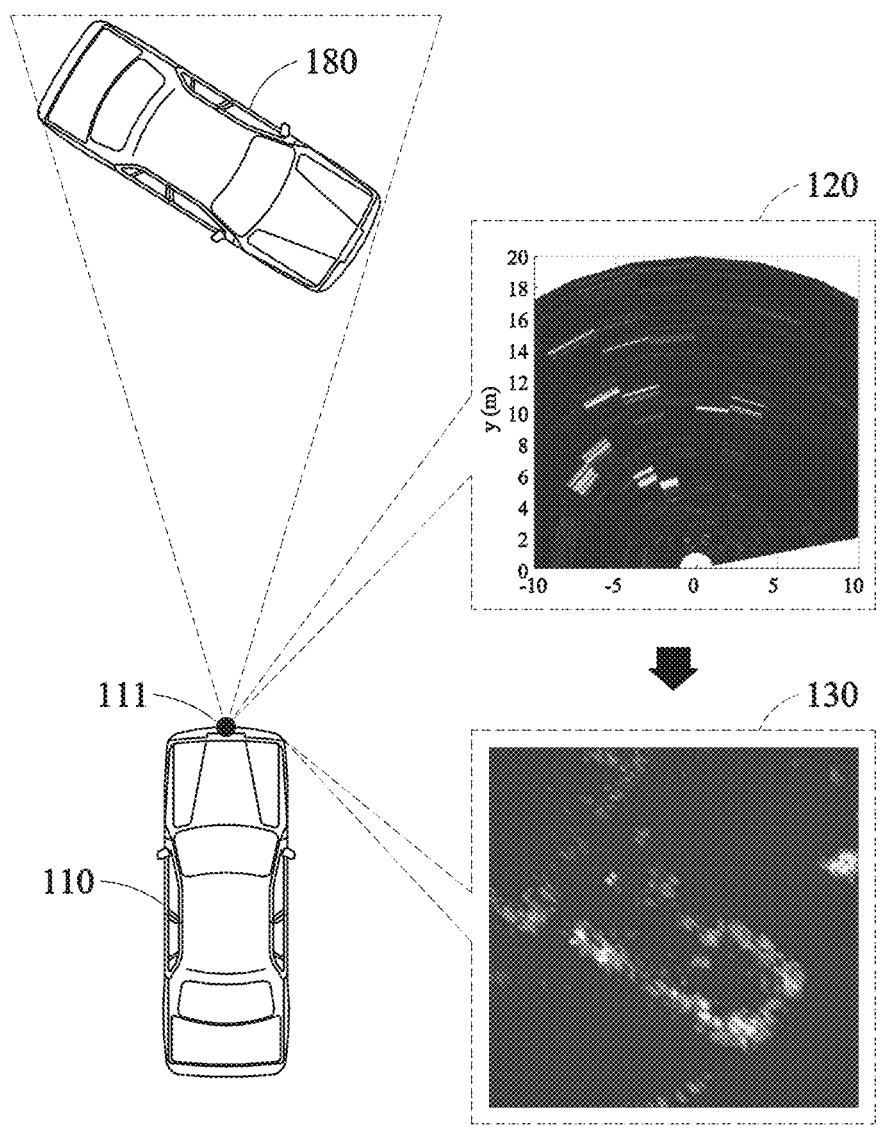
FIG. 1 illustrates a process of recognizing a surrounding environment through a radar signal processing method according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms, such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," "coupled to," or "accessed to" another component, it may be directly "connected to," "coupled to," or "accessed to" the other component, or there may be one or more other components intervening therebetween. In contrast, when an element is described as being "directly connected to," "directly coupled to," or "directly accessed to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

As used herein, the singular forms "a," "an," and "the" are intended to include the plural forms as well, unless the context clearly indicates otherwise. It will be further understood that the terms "comprises" and "comprising," when used in this specification, specify the presence of stated features, integers, steps, operations, elements, components, and/or a combination thereof, but do not preclude the presence or addition of one or more other features, integers, steps, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood by one of ordinary skill in the art to which this disclosure pertains and based on an understanding of the disclosure of the present application. Terms defined in dictionaries generally used should be construed to have meanings matching contextual meanings in the related art and the disclosure of the present application, and are not to be construed as an ideal or excessively formal meaning unless otherwise defined herein.

Hereinafter, the example embodiments are described in detail with reference to the accompanying drawings. Like reference numerals illustrated in the respective drawings refer to like elements and further description related thereto is omitted.

FIG. 1 illustrates a process of recognizing a surrounding environment through a radar signal processing method according to one or more embodiments.

Referring to FIG. 1, a radar signal processing device 110 may analyze a radar signal received at a radar sensor 111 of the signal processing device 110 and may detect information (e.g., a range, a velocity, and/or a direction) about a target 180 in front. The radar sensor 111 may be positioned inside a main body of the radar signal processing device 110 or outside the main body of the radar signal processing device 110. The radar signal processing device 110 may detect information about the target 180 in front by considering data collected by other sensors (e.g., an image sensor) as well as a radar signal received from the radar sensor 111. Resolving power of radar data processing may be classified into resolving power performance in terms of hardware and resolving power performance in terms of software.

For reference, the term "resolving power" used herein may refer to an ability of a device to discriminate a very small difference (for example, a minimum unit of discrimination power) and may be represented as "resolving power= (minimum discriminable gradation unit)/(entire operating range)." According to a decrease in a resolving power value of a device, more precise results may be output from the corresponding device. The resolving power value may also be referred to as a resolving power unit. For example, if the resolving power value of the device is small, the device may discriminate smaller units and may output results with an increased resolution and an improved precision. Conversely, if the resolving power value of the device is large, the device may not discriminate small units and may output results with a decreased resolution and a degraded precision.

According to one or more embodiments, the radar signal processing device 110 may be mounted to and/or included in a vehicle as illustrated in FIG. 1, the radar signal processing device 110 may be the vehicle, and/or the radar signal processing device 110 may include the vehicle. The vehicle may perform adaptive cruise control (ACC), autonomous emergency braking (AEB), blind spot detection (BSD), lane change assistance (LCA), and/or the like, based on the range from the target 180 detected by the radar signal processing device 110. Further, the radar signal processing device 110 may generate a surrounding map 130 in addition to a range detection. The surrounding map 130 refers to a map that represents positions of various targets present around the radar signal processing device 110, such as the target 180. A surrounding target may be a dynamic object, such as a vehicle and/or a human, and may be a static object that is present in a background, such as a guard rail and/or a traffic light.

As a method of generating the surrounding map 130, a single scan image method may be used. In the single scan image method, the radar signal processing device 110 may acquire a single scan image 120 from a sensor (e.g. the radar sensor 111) and generate the surrounding map 130 from the single scan image. The single scan image 120 may refer to an image that is generated from a radar signal generated by a single radar sensor 111 and may represent ranges that are indicated by radar signals received from an arbitrary elevation angle as relatively high resolving power. For example, in the single scan image 120 of FIG. 1, a horizontal axis denotes a steering angle of the radar sensor 111 and a vertical axis denotes a range from the radar sensor 111 to the target 180. Here, a form of the single scan image 120 is not limited to FIG. 1 and may be represented in another format according to a design.

The steering angle may represent an angle corresponding to a target direction from the radar signal processing device 110 to the target 180. For example, the steering angle may represent an angle between a heading direction of the radar signal processing device 110 (or a radar processing device 110) and a target direction. For reference, although the steering angle herein is mainly described based on an azimuth angle, it is provided as an example only. For example, the steering angle may apply to the elevation angle.

According to one or more embodiments, the radar signal processing device 110 may acquire information about a shape of the target 180 through a multi-radar map (e.g., the surrounding map 130). The multi-radar map may be generated from a combination of a plurality of radar scan images. For example, the radar signal processing device 110 may generate the surrounding map 130 by spatial-temporally combining radar scan images acquired according to a movement of the radar sensor 111. The surrounding map 130 may be a kind of a radar image map and may be used for pilot parking.

According to one or more embodiments, the radar signal processing device 110 may use direction of arrival (DOA) information to generate the surrounding map 130. The DOA information may refer to information indicating a direction in which a radar signal reflected from the target 180 is received. The radar signal processing device 110 may identify a direction in which the target 190 is present based on the radar sensor 111 using the DOA information. Therefore, the DOA information may be used to generate radar scan data and the surrounding map 130.

According to one or more embodiments, radar information (such as a range, a velocity, a DOA, and/or map information about the target 180) generated by the radar signal processing device 110 may be used to control a vehicle to which the radar signal processing device 110 is mounted. For example, control of the vehicle may include velocity and steering control of the vehicle, such as ACC, AEB, BSD, and LCA. A control system of the vehicle may control the vehicle by directly or indirectly using the radar information. For example, when a Doppler velocity of a target is measured, the control system may accelerate the vehicle to follow a corresponding target or may brake the vehicle to prevent colliding with the corresponding target.

Figure 2:
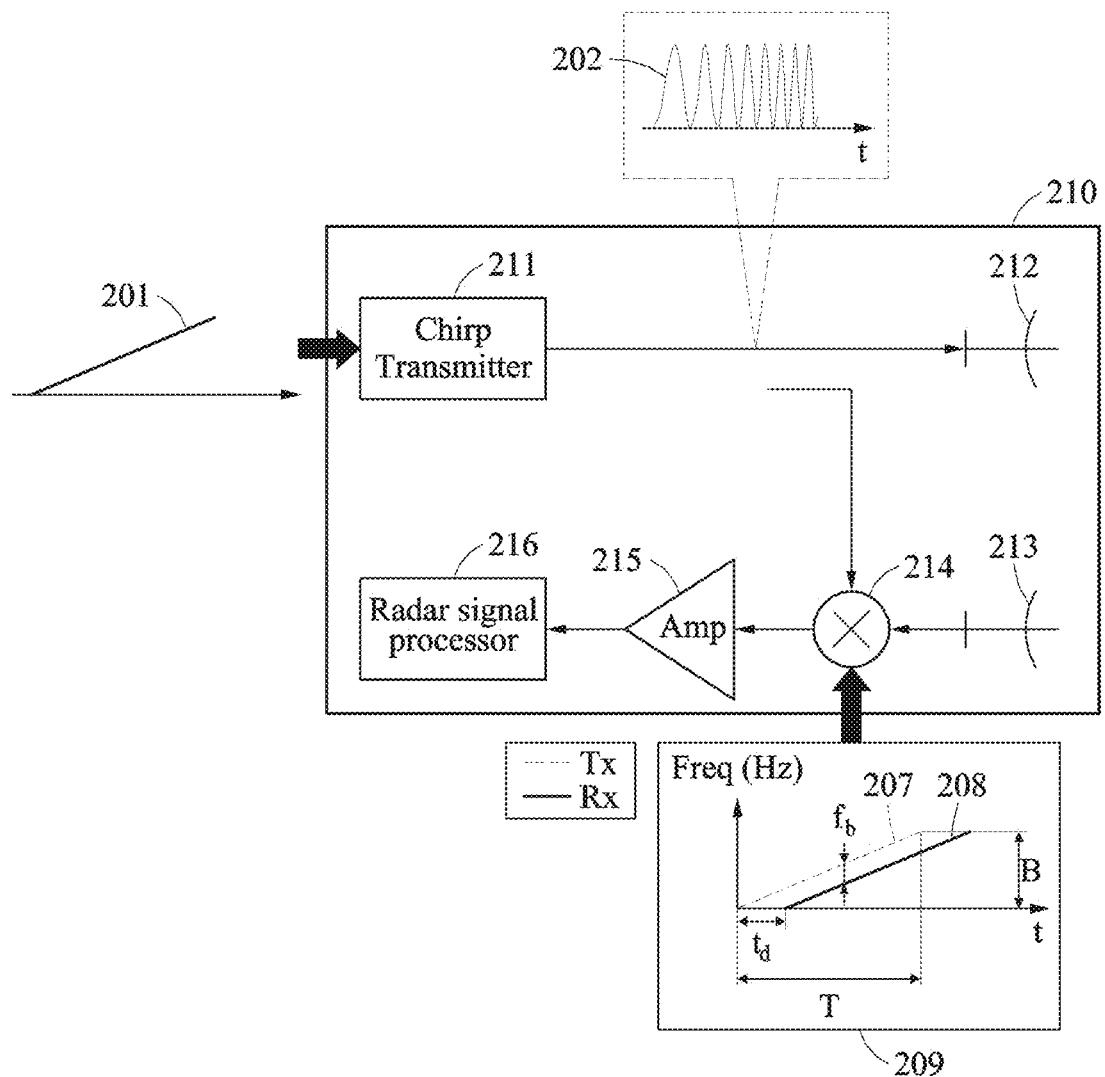
FIG. 2 is a diagram illustrating a configuration of a radar sensor according to one or more embodiments.

FIG. 2 is a diagram illustrating a configuration of a radar sensor according to one or more embodiments.

A radar sensor 210 may include a chirp transmitter 211, a transmit antenna 212, a receive antenna 213, a frequency mixer 214, an amplifier 215, and a radar signal processor 216 (e.g., one or more processors). The radar signal processor 216 may be a signal processor 420 of FIG. 4 and/or a processor 1410 of FIG. 14. In this case, the radar signal processor 216 may be present outside the radar sensor 210, such as the processor 1410. However, without being limited thereto, the radar signal processor 216 may generate radar data by analyzing a spectrum of a radar signal by itself and may transfer the generated radar data to the processor 1410 that is present outside. The radar data may refer to data generated by analyzing the radar signal sensed by the radar sensor 210 and may include, for example, a range-Doppler map and/or a range profile. Non-limiting examples of the radar data are described with reference to FIGS. 3 and 10.

The radar sensor 210 may radiate a signal through the transmit antenna 212 and may receive a signal through the receive antenna 213. The transmit antenna 212 may include one or more transmit antenna elements and the receive antenna 213 may include one or more receive antenna elements. For example, antennas (for example, the transmit antenna 212 and the receive antenna 213) may correspond to an array antenna. For example, the receive antenna 213 may include three or more receive antenna elements. Here, the receive antenna elements may be spaced at equal intervals.

The radar sensor 210 may be, for example, a mmWave radar and may measure a range from a target by analyzing a time of flight (ToF) that is a time used when a radiated electric wave is reflected by the target and returns and a change in a waveform of a radar signal. For reference, compared to an optic-based sensor including a camera, the mmWave radar may detect the front regardless of a change in an external environment, such as frog and rain. Also, the mmWave radar has excellent cost-performance compared to LiDAR and is one of sensors capable of complementing the aforementioned disadvantages found in the camera. For example, the radar sensor 210 may be implemented as a frequency modulated continuous wave (FMCW) radar. The FMCW radar may have characteristics robust against external noise.

The chirp transmitter 211 may generate a frequency modulated (FM) signal 202 of which frequency varies over time. For example, the chirp transmitter 211 may generate the frequency modulated signal 202 by performing a frequency modulation according to a frequency modulation characteristic of a frequency modulation model 201. The frequency modulated signal 202 may also be referred to as a chirp signal. Herein, the frequency modulation model 201 may represent a model indicating a change in a carrier frequency for a given transmission time in an arbitrary radar transmission signal. A vertical axis of the frequency modulation model 201 may represent a carrier frequency and a horizontal axis may represent a time. For example, the frequency modulation model 201 may have a frequency modulation characteristic of linearly changing (e.g., linearly increasing or linearly decreasing) a carrier frequency. As another example, the frequency modulation model 201 may have a frequency modulation characteristic of nonlinearly changing a carrier frequency.

Referring to FIG. 2, the frequency modulation model 201 may have a frequency modulation characteristic of linearly increasing a frequency over time. The chirp transmitter 211 may generate the frequency modulated signal 202 having the carrier frequency according to the frequency modulation model 201. For example, referring to FIG. 2, the frequency modulated signal 202 may represent a waveform in which the carrier frequency gradually increases in some sections and a waveform in which the carrier frequency gradually decreases in remaining sections. The frequency modulated signal 202 may also be referred to as a chirp signal.

The chirp transmitter 211 may transmit the frequency modulated signal 202 to the transmit antenna 212. The receive antenna 213 may receive a received signal that is reflected after a radiated signal (e.g., the frequency modulated signal 202 radiated by the transmit antenna 212) arrives at an obstacle and then returns. The radar sensor 210 may transmit the received signal to the radar signal processor 216 through a signal path from the receive antenna 213 to the radar signal processor 216. A signal radiated through the transmit antenna 212 may be referred to as a radar transmission signal and a signal received through the receive antenna 213 may be referred to as a radar reception signal.

For reference, the radar signal processing device 210 may further include a duplexer. The duplexer may determine a transmission path and a reception path of a signal through the transmit antenna 212 and the receive antenna 213. For example, while the radar sensor 210 radiates the frequency modulated signal 202, the duplexer may form a signal path from the chirp transmitter 211 to the transmit antenna 212 and may transmit the frequency modulated signal 202 to the transmit antenna 212 through the formed signal path and then radiate the same to an outside. While the radar sensor 210 receives the reflected signal from the target, the duplexer may form a signal path from the receive antenna 213 to the radar signal processor 216.

The frequency mixer 214 may compare a frequency 208 of a radar reception signal that is reflected from the target and a frequency 207 of a radar transmission signal. For example, the frequency 207 of the radar transmission signal may vary according to a change in a carrier frequency indicated by the frequency modulation model 201. The frequency mixer 214 may detect an intermediate frequency ($f_b$) (e.g., a beat frequency) corresponding to a frequency difference between the frequency 208 of the radar reception signal and the frequency 207 of the radar transmission signal. A frequency difference 209 between the radar transmission signal and the radar reception signal may represent a constant difference in a section in which the carrier frequency linearly increases along a time axis in the frequency modulation model 201, in a graph of FIG. 2, and is proportional to a range between the radar sensor 210 and the target. Therefore, the range between the radar sensor 210 and the target may be derived from the frequency difference 209 between the radar transmission signal and the radar reception signal. A beat frequency signal detected through the frequency mixer 214 may be transmitted to the radar signal processor 216 through the amplifier 215. The beat frequency signal may be represented as the following Equation 1, for example.

$$y(t) = \frac{\alpha}{2}\cos\left(\varphi_0 - 2\pi f_c t_d + \pi \frac{B}{T_c} t_d^2 - 2\pi \frac{B}{T_c} t_d t\right)$$ Equation 1

In Equation 1, $\alpha$ denotes a path loss attenuation, $f_c$ denotes a carrier frequency, $t_d$ denotes a round-trip delay, B denotes a sweep bandwidth of a transmitted chirp, and $T_c$ denotes a chirp duration. In FIG. 2, $T_c$ is illustrated as T and may also be represented as $T_{chirp}$. For reference, $t_d$ for an $i^{th}$ target may be calculated (e.g., determined) as $\tau_i$ according to Equation 6 below.

According to one or more embodiments, a plurality of radar sensors may be installed in a plurality of portions of a vehicle and a radar signal processing device may calculate a range, a direction, and a relative velocity to a target in all directions of the vehicle based on information sensed by the plurality of radar sensors. The radar signal processing device may be mounted to the vehicle and may provide various functions (e.g., ACC, AEB, BSD, LCA, etc.) that assist driving using the calculated information.

Each of the plurality of radar sensors may radiate, to an outside, a radar transmission signal including a chirp signal of which frequency is modulated based on a frequency modulation model and may receive a signal reflected from the target. The radar signal processing device may determine a range from each of the plurality of radar sensors to the target based on a frequency difference between the radiated radar transmission signal and the received radar reception signal. Also, when the radar sensor 210 includes a plurality of channels, the radar signal processing device may derive (e.g., determine) a DOA of a radar reception signal reflected from the target based on phase information of the radar reception signal.

The radar sensor 210 may use a wide bandwidth and employ a multiple input multiple output (MIMO) scheme for wide field of view (FOV) and high resolution (HR) of various applications. A range resolution may increase with a wide bandwidth and an angular resolution may increase through the MIMO scheme. The range resolution may represent a small unit used to discriminate range information about the target and the angular resolution may represent a small unit used to discriminate DOA information about the target. For example, the radar sensor 210 may use a wideband, such as 4 gigahertz (GHz), 5 GHz, and/or 7 GHz, instead of a narrowband, such as 200 megahertz (MHz), 500 MHz, and/or 1 GHz.

The radar sensor 210 may distinguish a transmission signal of each transmit antenna 212 according to MIMO through time division multiplexing (TDM). According to TDM, the transmit antennas 212 may alternately transmit a transmission signal. Therefore, in each transmission signal, a time length of a rising period of a carrier frequency (e.g., a chirp repetition period) may increase. This may result in decreasing the range of unambiguously measurable Doppler velocity and/or Doppler frequency. The radar signal processor 216 of one or more embodiments may perform signal processing robust against Doppler ambiguity by compensating for a coupling component between a Doppler velocity and/or a Doppler frequency and DOA caused by movement of the target in a radar system of a TDM MIMO scheme.

Figure 3:
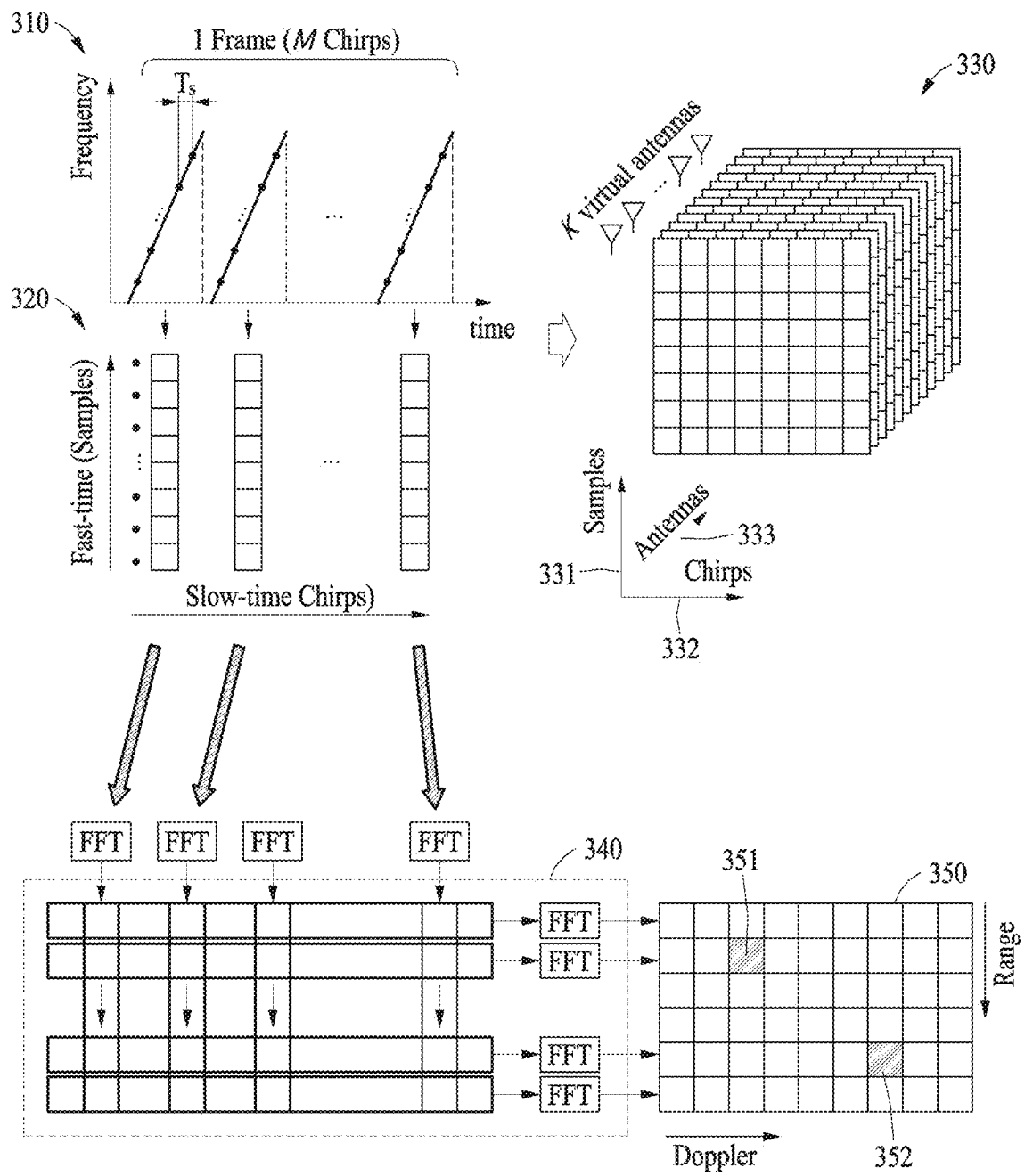
FIG. 3 illustrates a process of processing chirp sequences according to one or more embodiments.

FIG. 3 illustrates an operation of processing chirp sequences according to one or more embodiments.

A radar signal of a single frame may include a plurality of chirp signals. For example, the single frame may include a plurality of time slots, and a radar sensor may transmit a single chirp signal through a single transmit antenna in each time slot. The time slot may represent a unit time section for transmitting a single chirp signal. The single frame may correspond to a one-time scan. For example, a single frame may correspond to a one-time scan. For example, the single frame may include L chirp sequences, and each chirp sequence may include a plurality of time slots (e.g., M time slots). Each of a plurality of chirp sequences included in the same frame may include the same number of time slots as a number of transmit antennas included in the radar sensor. The radar signal of the single frame may include L×M chirp signals. The radar sensor may radiate L×M chirp signals in the frame corresponding to the one-time scan and may sense reflected signals of corresponding L×M chirp signals. Here, each of L and M may denote an integer of 1 or more. As described below, the radar sensor may include M transmit antenna elements, and each chirp sequence may include M time slots corresponding to a number of transmit antenna elements. In FIG. 3, a frequency change trend of a radar signal 310 for a frame when L=1 may include frequency change trends of the respective L×M chirp signals over time.

A radar signal of the aforementioned single frame may be interpreted according to a fast time axis and a slow time axis. The slow time axis may refer to a time axis distinguished by chirp signals, and the fast time axis may refer to a time axis in which a change in a frequency of an individual chirp signal is observable. For example, a radar signal processing device may transmit the radar signal 310 (e.g., L×M chirp signals) and may receive a reflected signal (e.g., L×M reflected signals) of the radar signal 310 in a single frame. The radar signal processing device may include L×M beat signals from the transmitted chirp signals and the reflected signals. A beat signal corresponding to each chirp signal in the fast time axis may be sampled at a plurality of sampling points. The beat signal may refer to a signal having a frequency difference between a transmission signal (e.g., a chirp signal) and a reflected signal of the corresponding transmission signal and may also be referred to as an intermediate frequency signal (IF signal) and a beat frequency signal. For example, an individual chirp signal may be radiated and reflected upon arriving at the target, and the reflected signal may be received by the radar sensor. A value of a beat signal between the radiated chirp signal and the reflected signal may be sampled. A beat signal corresponding to each chirp signal included in the radar signal 310 may be sampled at every sampling interval $T_s$. That is, S sampling values 320 may be acquired from a beat signal corresponding to a single chirp signal. Here, S denotes an integer of 1 or more. When the radar signal 310 includes L chirp sequences per frame and K virtual antennas receive individually the radar signal 310, a total of S×L×K sample values may be acquired. When a number of transmit antennas is M and a number of receive antennas is N, a number of virtual antennas may be K=M×N. Here, N denotes an integer of 1 or more. Radar raw data 330 may refer to a data cube configured in S×L×K dimensions along a sample axis 331, a chirp axis 332, and an antenna axis 333. Here, the radar raw data 330 is not limited to the data cube of FIG. 3 and may vary depending on a design. The radar raw data 330 may be transformed to radar data in a format that includes a range profile, an angular profile, and a range-Doppler map by the following frequency transform.

When the target is moving, a beat frequency may include a Doppler frequency component by movement of the target in addition to a range component by a range from the target, as shown by Equation 2 below, for example.

$$f_B = f_R - f_D = \frac{B}{T_{chirp}} \frac{2R^0}{c} + \frac{2v}{\lambda} \qquad \text{Equation 2}$$

In Equation 2, $f_R$ denotes a range component, $f_D$ denotes a Doppler frequency component, $\lambda$ denotes a wavelength, and v denotes a velocity of the target.

The radar signal processing device may generate a range-Doppler map 350 by performing a frequency transform 340 on the radar raw data 330. For example, the frequency transform 340 may include a two-dimensional (2D) Fourier transform that includes a range-based first Fourier transform and a Doppler frequency-based second Fourier transform. Here, the first Fourier transform may be a fast Fourier transform (FFT), the second Fourier transform may be a Doppler FFT, and the 2D Fourier transform may be a 2D FFT. For reference, the radar signal processing device may acquire a range profile by performing the range-based first Fourier transform alone on the radar raw data 330. The range profile may represent strength of a received signal for each range.

The radar signal processing device may detect target cells (for example, a first target cell 351 and a second target cell 352) from the range-Doppler map 350. For example, the radar signal processing device may detect the first target cell 351 and the second target cell 352 through constant false alarm rate (CFAR) detection related to the range-Doppler map 350. The CFAR detection may represent a thresholding-based detection scheme.

The radar signal processing device may determine an ambiguous Doppler velocity of a first target based on first frequency information of the first target cell 351. For example, the first target cell 351 may be a cell corresponding to peak intensity in a Doppler spectrum of the radar raw data 330. The first frequency information may include a Doppler frequency in which the peak intensity appears. The radar signal processing device may determine a Doppler velocity corresponding to the Doppler frequency as an ambiguous Doppler velocity. A relationship between an unambiguous Doppler velocity and an ambiguous Doppler velocity may be represented as the following Equation 3, for example.

$$v_{D,unamb} = v_{D,amb} q - (2 v_{D,max})$$ Equation 3:

In Equation 3, $v_{D,unamb}$ denotes the unambiguous Doppler velocity, $v_{D,amb}$ denotes the ambiguous Doppler velocity, q denotes an ambiguity number, and $v_{D,max}$ denotes a maximum range of Doppler velocity unambiguously measurable through a chirp sequence signal. q may have an integer value. The Doppler velocity corresponds to the Doppler frequency. A non-limiting example of an operation of determining an unambiguous radial velocity based on the Doppler frequency is described below with reference to FIG. 11.

The radar signal processing device according to one or more embodiments may radiate a plurality of linear chirp signals (e.g., a chirp signal of which frequency linearly increases) in a single frame. For example, the radar signal processing device may radiate tens to hundreds of chirp signals in the single frame. The radar signal processing device may estimate a velocity based on a phase difference caused by a Doppler phenomenon between the radiated chirp signals and corresponding reflected signals. Also, the radar signal processing device may estimate an angle (e.g., a DOA) of a target based on a radar sensor using a MIMO antenna structure.

The radar signal processing device may transmit a plurality of chirp signals using a plurality of transmit antennas. The radar signal processing device may identify a transmit antenna used to radiate a transmission signal (e.g., a chirp signal) corresponding to a reflected signal received by a plurality of receive antennas based on a TDM scheme. The TDM scheme may represent a scheme of activating a transmit antenna with a physical time difference between operations of radiating chirp signals. Here, when a radar signal to be transmitted in a single frame includes a total of L×M chirp signals, the radar signal to be transmitted by each transmit antenna may be modeled as shown in the following Equation 4, for example.

$$s(t) = \begin{cases} \cos\left\{2\pi\left(f_c t + \frac{1}{2}\frac{B}{T_c}t^2\right)\right\}, & \text{where } 0 \le t' < T_c \\ 0, & \text{where } T_c \le t' < T_p \end{cases}$$ [Equation 4]

$$t = t' + (l \cdot M + m) \cdot T_p,$$ Equation 5 where $l \in \{0, \ldots, L-1\}, m \in \{0, \ldots, M-1\}$

In Equation 4 and Equation 5, $f_c$ denotes a carrier frequency, B denotes a sweep bandwidth of a transmitted chirp, and $T_c$ denotes a length of a section in which a frequency changes (e.g., linearly increases) in a chirp signal, an example of which is described above with reference to FIG. 2. $T_p$ refers to a time interval (e.g., a chirp radiation period) from a point in time at which radiation of a single chirp signal starts to a point in time at which radiation of a next chirp signal starts and may correspond to a time length of a time slot. t denotes a point in time (a time point) in a frame and t' denotes a point in time in an individual time slot. The radar signal processing device may transmit L×M chirp signals using time-division through M transmit antennas. The radar signal processing device may receive, using a receive antenna, a reflected signal that is radiated and then hits the target and returns. A time (e.g., a round-trip time) $\tau_i$ used for a radar signal to be radiated and then return from an $i^{th}$ target to a receive antenna may be represented based on a range, a velocity, and an angle of the $i^{th}$ target as shown in the following Equation 6, for example.

$$\tau_i(t', l \cdot M + m, n) = \frac{2[r_i + v_i(l \cdot M + m)T_p] + [(l \cdot M + m) \bmod M]}{c} \cdot \frac{d_{TX}\sin\theta_i + n \cdot d_{RX}\sin\theta_i}{c}$$ Equation 6

In Equation 6, l·M+m denotes a chirp index, n denotes an index of a receive antenna, $r_i$ denotes the range of the $i^{th}$ target, $v_i$ denotes the velocity of the $i^{th}$ target, and $\theta_i$ denotes the angle of the $i^{th}$ target. $D_{TX}$ denotes an interval between transmit antennas and $d_{RX}$ denotes an interval between receive antennas. Assuming a uniform linear array design, $d_{RX}$ may be $\lambda/2$ and $d_X$ may be $M \times d_{RX}$.

For reference, when transmit antennas are sequentially activated, an index of a corresponding transmit antenna may be represented as (l·M+m) mod M. The index of the transmit antenna may be dependent on l·M+m that is the chirp index. Since a component having an $MT_p$ period occurs in the radar signal, it may not be possible to measure the Doppler effect at every $T_p$ period. When only the same transmit antenna is iteratively activated, a maximum measurable velocity may be $$v_{max} = \frac{\lambda}{4T_p}.$$

As described above, when a plurality of transmit antennas are alternately activated in a sequential manner in a given frame, the maximum measurable velocity may decrease to $$v_{max} = \frac{\lambda}{4MT_p}.$$

Therefore, the maximum Doppler velocity that may be measured without ambiguity may decrease by 1/M. Hereinafter, a radar signal processing method of one or more embodiments having angular resolving power while increasing the maximum Doppler velocity is described.

Figure 4:
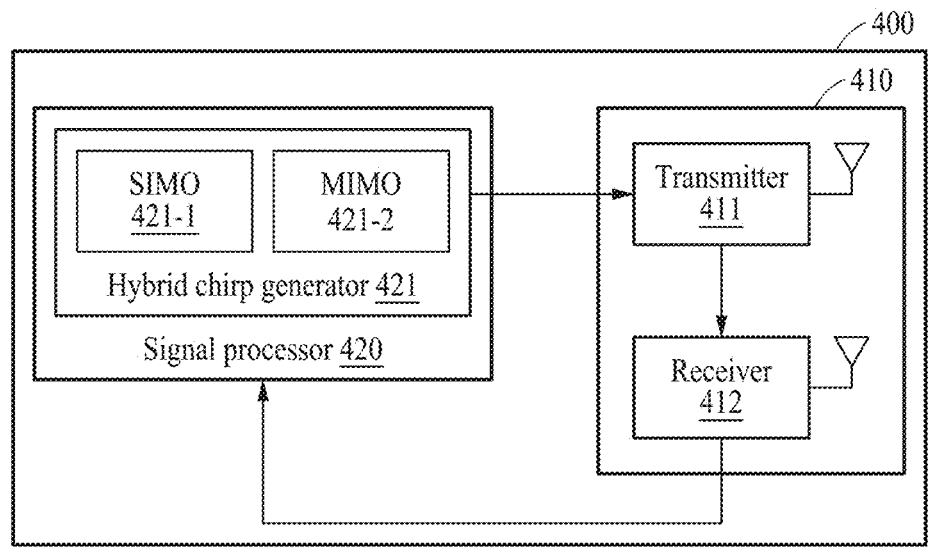
FIG. 4 is a diagram illustrating a configuration of a radar signal processing device according to one or more embodiments.

FIG. 4 is a diagram illustrating a configuration of a radar signal processing device according to one or more embodiments.

A radar signal processing device 400 may include a radar sensor 410 and a signal processor 420 (e.g., one or more processors). The radar sensor 410 may radiate a radar signal to an outside of the radar sensor 410 and may receive a signal of the radiated radar signal that is reflected by a target. The radiated radar signal herein may be referred to as a radar transmission signal and the received signal may be referred to as a radar reception signal. The radar transmission signal may include a chirp signal with a modulated carrier frequency based on a frequency modulation model. A frequency of the radar transmission signal may vary within a predetermined band. For example, the frequency of the radar transmission signal may linearly vary within the predetermined band.

The radar sensor 410 may include a transmitter 411 and a receiver 412. The radar sensor 410 may include an array antenna and may transmit the radar transmission signal and receive the radar reception signal through the array antenna. The array antenna may include a plurality of antenna elements. According to one or more embodiments, MIMO may be implemented through the plurality of antenna elements. Here, a plurality of MIMO channels may be formed by the plurality of antenna elements. The transmitter 411 may include a plurality of transmit antenna elements and the receiver 412 may include a plurality of receive antenna elements. For example, a plurality of channels corresponding to M×N virtual antennas may be formed through M transmit antenna elements and N receive antenna elements. Here, radar reception signals received through the respective channels may have different phases.

According to one or more embodiments, the signal processor 420 may include a hybrid chirp generator 421. For example, the hybrid chirp generator 421 may generate a radar signal that includes a chirp signal 421-1 for single input multiple output (SIMO) and a chirp signal 421-2 for MIMO in a single frame. The signal processor 420 may radiate the radar signal in which the chirp signal 421-1 for SIMO and the chirp signal 421-2 for MIMO are mixed in the same frame through the radar sensor 410. Although FIG. 4 illustrates the hybrid chirp generator 421 as an internal module of the signal processor 420, it is provided as an example only.

The processor (e.g., the signal processor 420) of the radar signal processing device 400 may radiate the chirp signal 421-1 for SIMO and the chirp signal 421-2 for MIMO in time slots individually designated within the same frame through a transmit antenna element. Herein, the chirp signal 421-1 for SIMO and the chirp signal 421-2 for MIMO may have the same chirp waveform, period, and time length and may be distinguished in time. A time slot in which the chirp signal 421-1 for SIMO is allocated may be referred to as a SIMO slot and a time slot in which the chirp signal 421-2 for MIMO is allocated may be referred to as a MIMO slot. The chirp signal 421-1 for SIMO may be transmitted through the same transmit antenna in SIMO slots. One of at least two antennas for MIMO may be the same antenna as a single antenna for SIMO. The chirp signal 421-2 for MIMO may be transmitted through a plurality of transmit antennas (e.g., the at least two antennas for MIMO) in MIMO slots. In each MIMO slot, a single transmit antenna that is selected randomly or in predetermined order may be activated to transmit the chirp signal 421-2 for MIMO. Each of a plurality of transmit antenna elements included in the radar sensor 410 may be activated at least once in MIMO slots during a single frame. The processor may allocate each of the plurality of transmit antenna elements to one or more MIMO slots within a single frame.

Radar data may be generated based on the radar transmission signal and the radar reception signal. For example, the radar sensor 410 may transmit the radar transmission signal through the array antenna based on the frequency modulation model, may receive the radar reception signal through the array antenna when the radar transmission signal is reflected by the target, and may generate an intermediate frequency (IF) signal based on the radar transmission signal and the radar reception signal. The signal processor 420 may perform a sampling operation on the intermediate frequency signal and may generate radar raw data based on results of the sampling operation. The signal processor 420 may generate radar data by performing a frequency analysis on the radar raw data.

For example, the signal processor 420 may generate and use information about the target based on the radar data. For example, the processor 420 may perform a range FFT, a Doppler FFT, a CFAR detection, and/or a DOA estimation based on the radar data, and may acquire information about the target, such as a range, a velocity, and/or a direction. Information about the target may be provided for various applications, such as ACC, AEB, BSD, and/or LCA.

Figure 5:
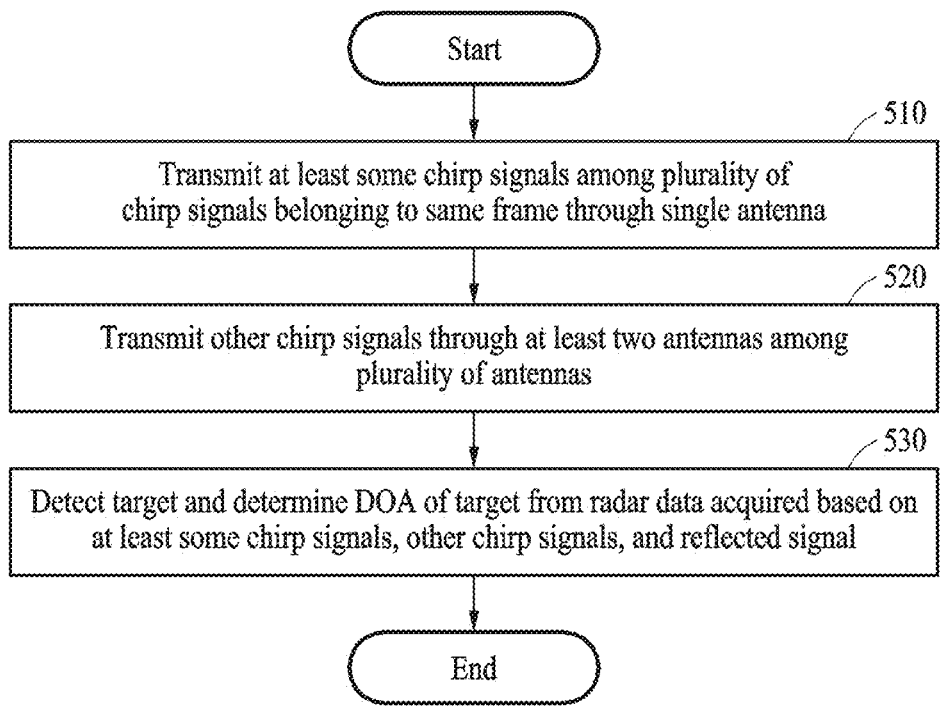
FIG. 5 is a flowchart illustrating a radar signal processing method according to one or more embodiments.

FIG. 5 is a flowchart illustrating a radar signal processing method according to one or more embodiments.

In operation 510, a radar sensor of an electronic device (e.g., a radar signal processing device) may transmit at least some (i.e., two or more) chirp signals (e.g., chirp signals for SIMO) among a plurality of chirp signals belonging to the same frame through a single antenna among a plurality of antennas. For example, the electronic device may transmit chirp signals for SIMO in different time slots within the same frame through the single antenna.

In operation 520, the radar sensor of the electronic device may transmit other chirp signals (e.g., chirp signals for MIMO) through at least two antennas among the plurality of antennas. For example, the electronic device may transmit chirp signals for MIMO through different antennas in different time slots within the same frame. Therefore, in operation 520, although chirp signals for SIMO may be radiated through the same single antenna in the same frame (e.g., a chirp sequence), chirp signals for MIMO may be radiated through different antennas within the same frame. For example, a first MIMO chirp signal among chirp signals for MIMO may be radiated in a first time slot through a first antennal element and a second MIMO chirp signal may be radiated in a second time slot through a second antenna element.

In operation 530, the processor of the electronic device may detect a target and determine a DOA of the target from radar data acquired based on the at least some chirp signals (e.g., the chirp signals for SIMO), the other chirp signals (e.g., the chirp signals for MIMO), and a reflected signal. For example, the electronic device may acquire first radar data based on the at least some chirp signals (e.g., the chirp signals for SIMO) and corresponding reflected signals. The electronic device may detect the target using the first radar data. The electronic device may acquire second radar data based on the other chirp signals (e.g., the chirp signals for MIMO) and corresponding reflected signals. The electronic device may determine the DOA using the second radar data. For example, the electronic device may identify a bin of the second radar data corresponding to the determined target using the first radar data and may determine the DOA of the target based on the identified bin.

The electronic device according to one or more embodiments may prevent a decrease in a maximum unambiguous measurable velocity using the first radar data acquired based on the chirp signals for SIMO. Also, the electronic device according to one or more embodiments may increase a maximum measurable velocity range by determining a Doppler velocity based on the first radar data and the second radar data acquired based on chirp signals for MIMO. For example, a maximum velocity estimate based on the first radar data may be $$v_{max} = \frac{\lambda}{4T_p}.$$

Also, the electronic device may aperiodically activate a transmit antenna in MIMO slots within a frame by transmitting a chirp signal for MIMO through a randomly selected transmit antenna. For reference, although activation order of a transmit antenna may be randomly determined, all transmit antennas within a single frame may be activated within a single frame for angle estimation. Also, the electronic device may perform radar signal transmission based on a variable carrier frequency (VCF) scheme by differently setting a carrier frequency of a chirp signal for SIMO and a carrier frequency of a chirp signal for MIMO. Therefore, the electronic device may associate SIMO-based first radar data and MIMO-based second radar data and may determine an ambiguity number described in Equation 3 although the maximum velocity estimate is exceeded. That is, the electronic device of one or more embodiments may remove ambiguity of the Doppler velocity through the mixture of SIMO and MIMO.

Therefore, the electronic device of one or more embodiments may provide an angle estimation while providing an instantaneous velocity measurement over a wide velocity range compared to typical sensors (e.g., a camera sensor and a LiDAR sensor) for an advanced driver assistance system (ADAS).

Figure 6:
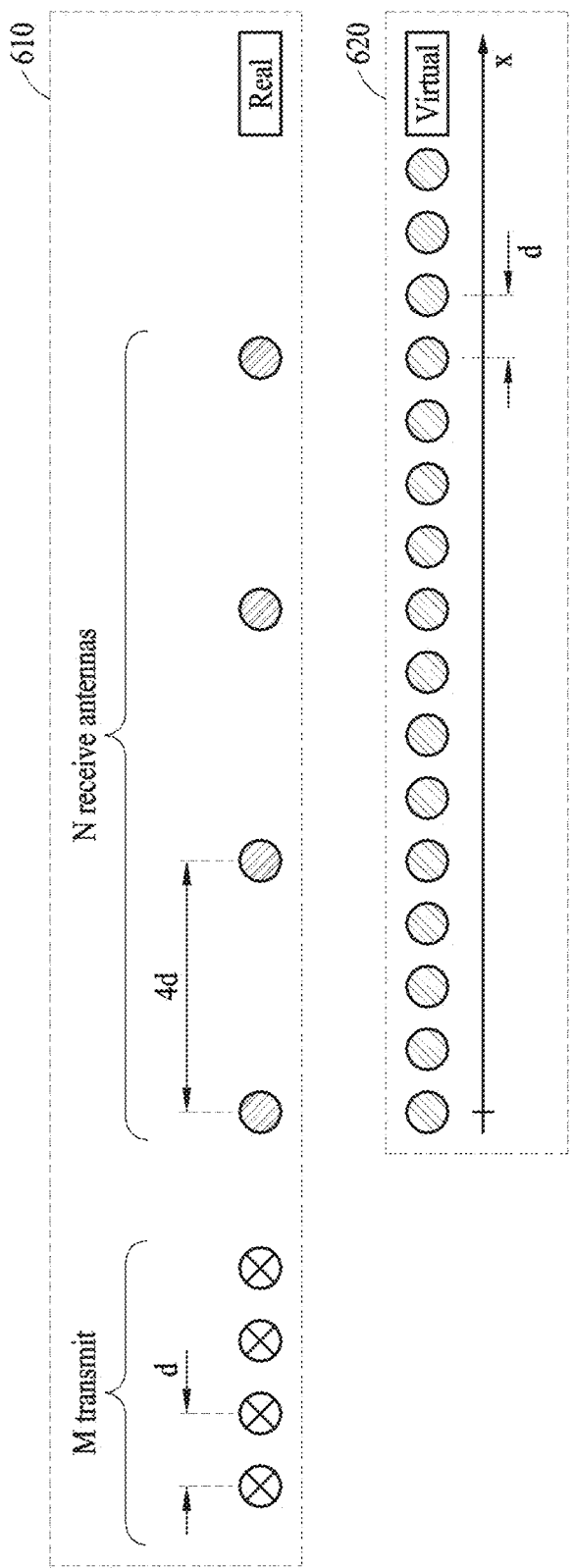
FIG. 6 illustrates a receive antenna array of a radar sensor according to one or more embodiments.

FIG. 6 illustrates a receive antenna array of a radar sensor according to one or more embodiments.

A radar sensor 610 according to one or more embodiments may include a plurality of transmit antennas and a plurality of receive antennas. FIG. 6 illustrates M transmit antennas and N receive antennas. A physical interval or distance between M transmit antennas may be d and a physical interval or distance between N receive antennas may be 4d. A number of virtual antennas 620 may be calculated as a product between the number of transmit antennas and the number of receive antennas that are horizontally or vertically arranged. For example, the number of virtual antennas 620 may be determined as M×N based on the number of transmit antennas, M, and the number of receive antennas, N. An angular resolution may be improved according to an increase in the number of virtual antennas 620. There may be a tradeoff between a number of antennas and a physical size of the radar sensor 610. A non-limiting example of an angle calculation for a target in an antenna array structure of FIG. 6 is described below.

For example, when a round-trip delay component of a beat frequency signal of Equation 1 is analyzed in more detail, the following Equation 7, for example, may be derived.

$$t_d = \frac{2R}{c} = \frac{2(R^0 + R^\theta)}{c} = \frac{2R^0 + d\sin\theta}{c} = t_{d,0} + t_{d,\theta} \quad \text{Equation 7}$$

In Equation 7, R denotes a range from the target, c denotes a velocity of light, and d denotes an interval between antenna elements. According to Equation 7, a round-trip delay component may be decomposed into a range component ($t_{d,0}$) and a DOA component ($t_{d,\theta}$). Equation 1 may be represented as the following Equation 8 to Equation 11, for example, based on the range component ($t_{d,0}$) and the DOA component ($t_{d,\theta}$) of the round-trip delay component.

$$y(t) = \frac{\alpha}{2}\cos(\Phi_0 + \Phi_t(t_{d,0}) + \Phi_t(t_{d,\theta})) \quad \text{Equation 8}$$

$$\Phi_0 = -2\pi f_c t_{d,0} + \pi\frac{B}{T_c}t_{d,0}^2 - 2\pi f_c t_{d,\theta} + 2\pi\frac{B}{T_c}t_{d,0}t_{d,\theta} + \pi\frac{B}{T_c}t_{d,\theta}^2 \quad \text{Equation 9}$$

$$\Phi_t(t_{d,0}) = -2\pi\frac{B}{T_c}t_{d,0}t \quad \text{Equation 10}$$

$$\Phi_t(t_{d,\theta}) = -2\pi\frac{B}{T_c}t_{d,\theta}t \quad \text{Equation 11}$$

The range from the target may be derived by detecting a $\Phi_t(t_{d,0})$ component through frequency analysis (e.g., Fourier transform) of the beat frequency signal for each antennal element. A DOA may be estimated by detecting a third term $2\pi f_c t_{d,\theta}$ of the $\Phi_0$ component from a phase difference between antenna elements.

When the radar sensor 610 includes a plurality of receive channels, phase information of a radar reception signal may represent a phase difference between a phase of a signal received through each receive channel and a reference phase. The reference phase may be an arbitrary phase and may be set as a phase of a single receive channel among the plurality of receive channels. For example, for a single receive antenna element among a plurality of receive antenna elements, the radar signal processing device may set a phase of a receive antenna element adjacent to the single receive antenna element as the reference phase.

Also, the radar signal processing device may generate a radar vector of a dimension corresponding to a number of receive channels of the radar sensor 610. For example, when the radar sensor 610 includes four receive channels, the radar signal processing device may generate a 4D radar vector that includes a phase value corresponding to each receive channel. The phase value corresponding to each receive channel may be a numerical value that represents the phase difference.

Figure 10:
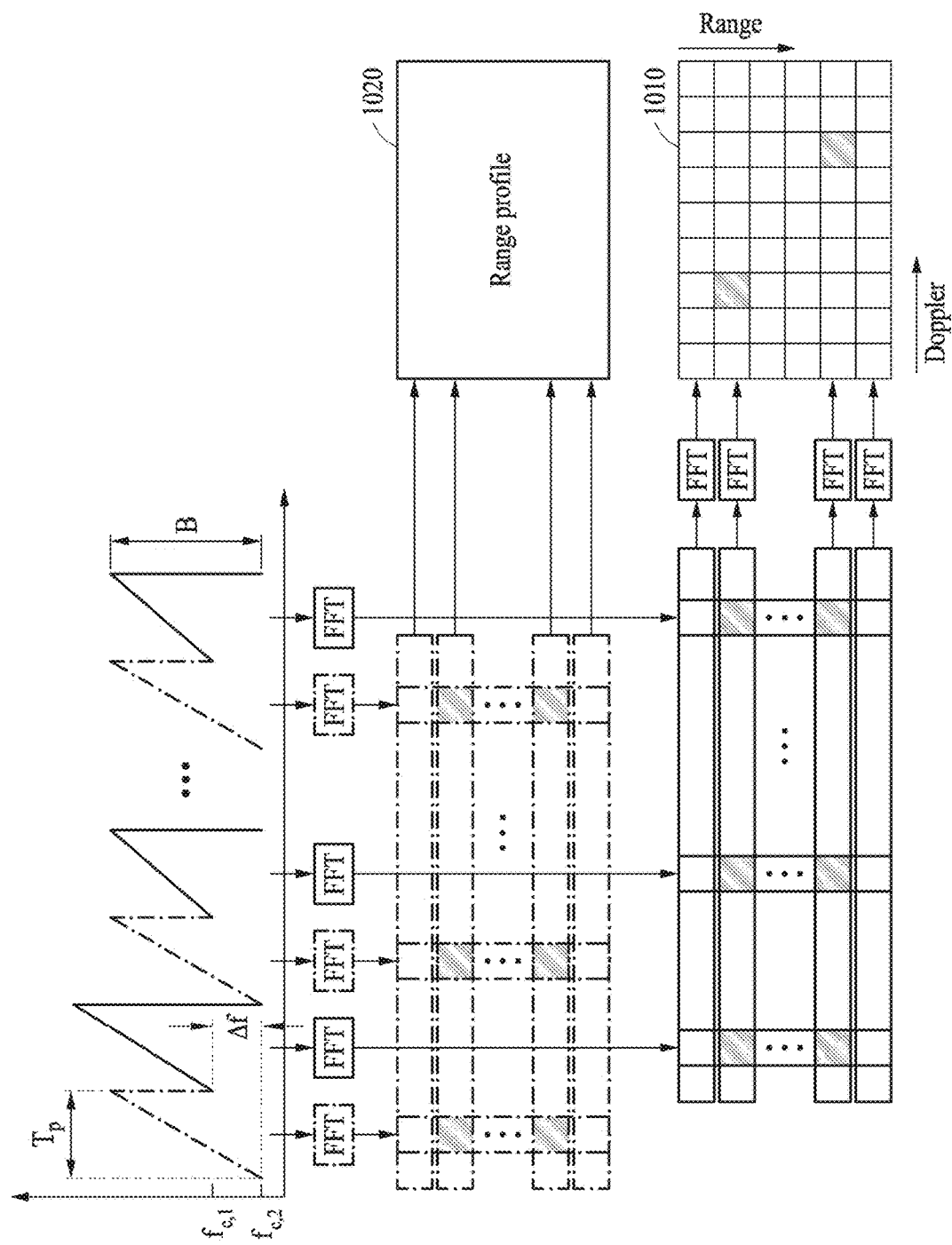
FIG. 10 illustrates one or more of processing a radar signal based on a variable carrier frequency (VCF) according to one or more embodiments.

As described above, although the radar sensor 610 includes the plurality of receive antennas and the plurality of transmit antennas, description is mainly made based on the plurality of transmit antennas for clarity of description. Here, since description is made based on an example that the radar sensor 610 includes the plurality of receive antennas, the electronic device may perform the same operation for radar reception signals received through the receive antennas. For example, although below FIG. 10 illustrates first radar data and second radar data for a single receive antenna as an example, it is provided as an example. The first radar data and the second radar data may be acquired for the plurality of receive antennas.

Figure 7:
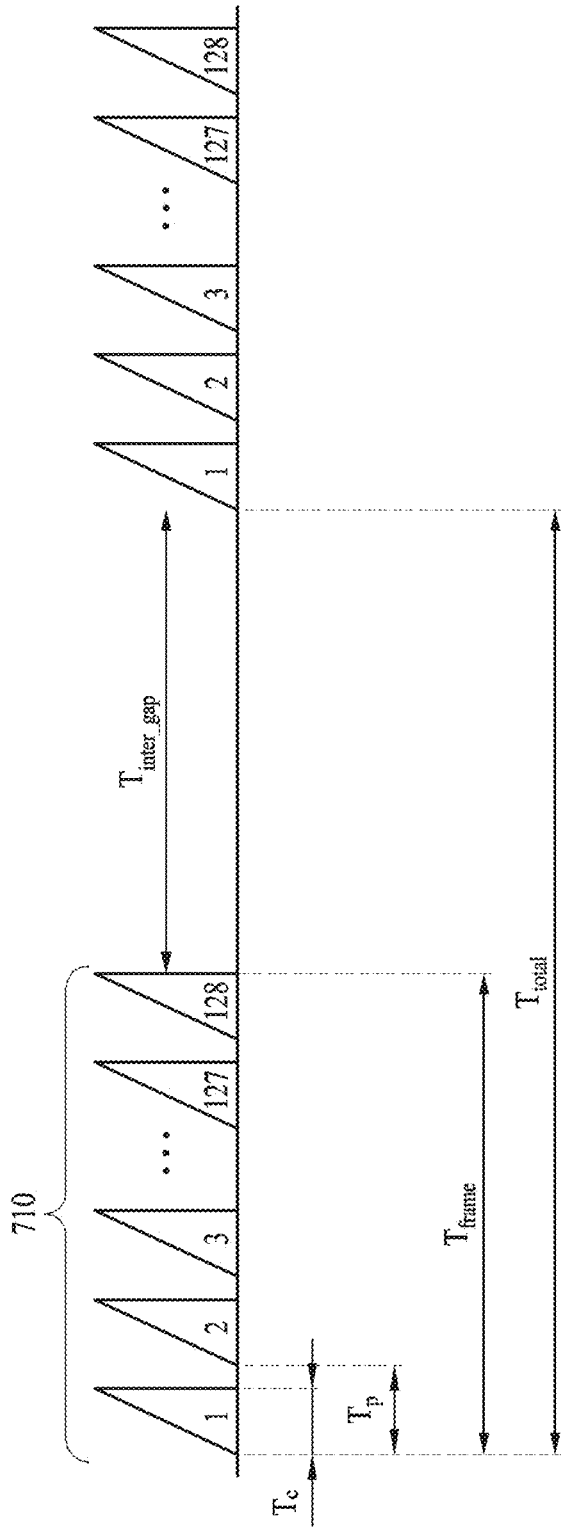
FIG. 7 illustrates an inter-frame interval of a radar signal and an inter-chirp interval in a frame according to one or more embodiments.

FIG. 7 illustrates an inter-frame interval of a radar signal and an inter-chirp interval in a frame according to one or more embodiments.

Referring to FIG. 7, a radar signal of a single frame according to one or more embodiments may include a plurality of chirp signals. For example, a chirp duration may be $T_c$=54 μs and a chirp radiation period may be $T_p$=58 μs. A margin between adjacent chirp signals may be $T_p$-$T_c$=4 μs. A frame length may be $T_{frame}$=7.4 ms, an inter-frame interval may be $T_{inter\_gap}$=94.9 ms and a frame period may be $T_{total}$=100 ms. FIG. 7 illustrates an example in which a frame rate is 10 Hz.

To remove ambiguity from sensing results of a radar signal and to expand a maximum measurable velocity range, an electronic device according to one or more embodiments may transmit a radar signal (e.g., a hybrid radar signal) in which a MIMO scheme (e.g., a random transmission scheme and a VCF scheme) and a SIMO scheme are mixed.

The electronic device may activate the same transmit antenna to radiate a chirp signal for SIMO in a SIMO slot among time slots within a frame. When the same transmit antenna is activated in SIMO slots, loss of velocity resolving power in velocity estimation may be minimized. Also, when chirp signals are transmitted in units of tens of μs within a single frame, an association issue may be ignored due to the assumption that there is little or no change in the range from the electronic device to the target in the same frame.

For reference, although a hybrid scheme (e.g., an intra-frame hybrid scheme) within the same frame is mainly described, it is provided as an example only. Without being limited thereto, the electronic device may employ a hybrid scheme (e.g., an inter-frame hybrid scheme) of iteratively activating a single transmit antenna in a first frame and randomly activating all transmit antennas in a second frame different from the first frame. Since it may not be guaranteed that the target is present in the same range bin or angle bin in different frames, the electronic device may perform a target association of identifying a target corresponding to a target A in the first frame from among a plurality of targets B, C, and D detected in the second frame.

Figure 8:
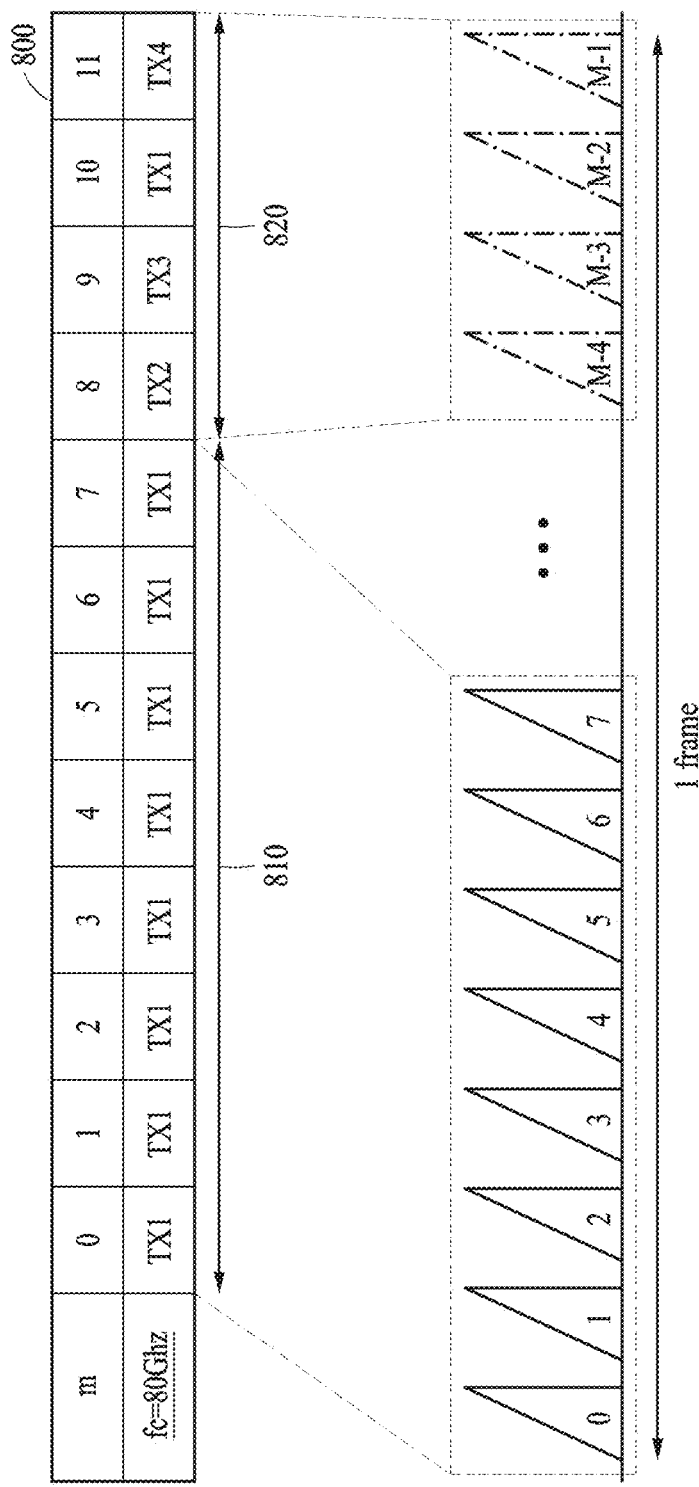
FIGS. 8 and 9 illustrate examples of a chirp sequence in which a single input multiple output (SIMO) slot and a multiple input multiple output (MIMO) slot are mixed according to one or more embodiments.
Figure 9:
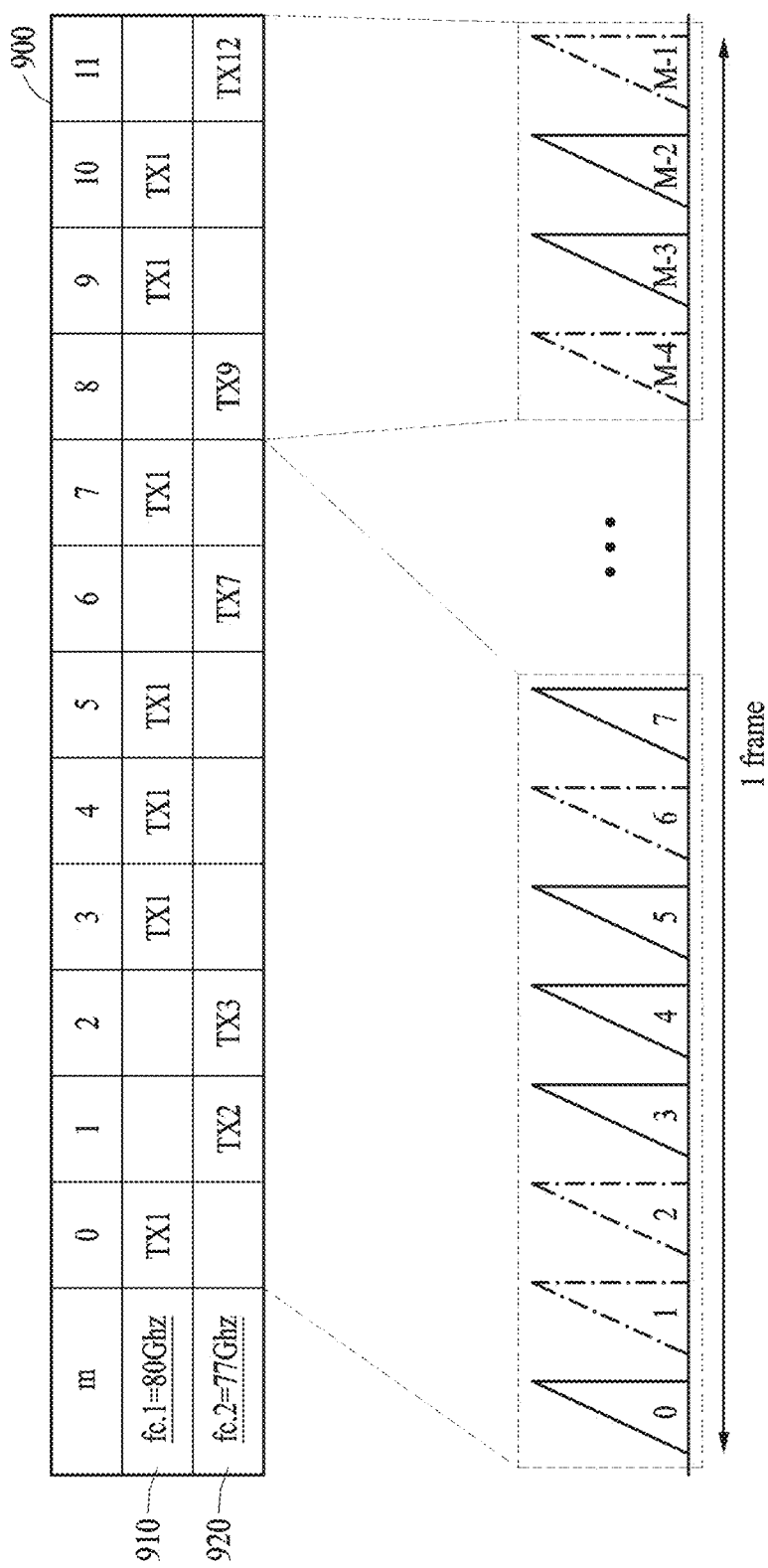

FIGS. 8 and 9 illustrate examples of a chirp sequence in which a SIMO slot and a MIMO slot are mixed according to one or more embodiments.

For example, a single chirp sequence in a single frame of a radar signal is described with reference to FIGS. 8 and 9. An electronic device according to one or more embodiments may radiate a single chirp signal through a single transmit antenna per time slot of a chirp sequence. As described above, the electronic device may radiate a chirp signal for SIMO in a SIMO slot among time slots of the chirp sequence through a single transmit antenna and may radiate a chirp signal for MIMO in a MIMO slot through a plurality of transmit antennas. That is, although the same transmit antenna may be activated in SIMO slots, different transmit antennas may be activated in MIMO slots. For example, a radar sensor of the electronic device may transmit the respective chirp signals in MIMO slots in a single chirp sequence within the same frame through different antennas. The electronic device may allocate at least one of the MIMO slots included in the same frame to each of a plurality of transmit antennas for MIMO. A first transmit antenna element allocated to a single MIMO slot (e.g., a first MIMO slot) among the MIMO slots may differ from a second transmit antenna element allocated to another MIMO slot (e.g., a second MIMO slot). In this case, the plurality of transmit antennas for MIMO may be activated at least once. For reference, although an example in which all transmit antennas included in the radar sensor are selectively activated for MIMO is described herein, it is provided as an example only. Some antennas among the plurality of transmit antennas included in the radar sensor may be set as antennas for MIMO and some other antennas may be set as antennas for SIMO.

FIG. 8 illustrates a chirp sequence 800 in which transmit antennas are randomly allocated to MIMO slots 820. For example, the chirp sequence 800 may include SIMO slots 810 from a zeroth time slot to a seventh time slot and the MIMO slots 820 from an eighth time slot to an eleventh time slot. Although FIG. 8 illustrates only a single chirp sequence 800, it is provided as an example only and a plurality of chirp sequences may be included in a single frame.

According to one or more embodiments, the radar sensor may transmit a corresponding chirp signal through a transmit antenna that is randomly determined for a time slot (e.g., MIMO slots) selected for each of other chirp signals in the single chirp sequence 800 within the same frame. Among time slots within a single frame and/or a single chirp sequence, a MIMO slot may be randomly selected. The radar sensor may transmit a chirp signal for MIMO by activating all the transmit antenna within the same frame at least once. For example, in FIG. 8 the radar sensor may include four transmit antenna elements (TX1, TX2, TX3, and TX4), as a non-limiting example. A first transmit antenna element TX1 may be allocated to the SIMO slots 810. Among the MIMO slots 820, a second transmit antenna element TX2 may be allocated to the eighth time slot, a third transmit antenna element TX3 may be allocated to the ninth time slot, the first transmit antenna element TX1 may be allocated to the tenth time slot, and a fourth transmit antenna element TX4 may be allocated to the eleventh time slot. FIG. 8 illustrates an example in which, in a single chirp sequence 800, all the transmit antenna elements are allocated once for the MIMO slots 820. Referring to FIG. 8, one or more antenna elements (e.g., the first antenna element TX1) among antenna elements allocated to the SIMO slots 810 and the MIMO slots 820 may be common. The electronic device according to one or more embodiments may increase a maximum Doppler velocity estimate compared to a first comparative example (e.g., simple TDM) by radiating and receiving a radar signal that includes the chirp sequence 800 including the SIMO slots 810 and the MIMO slots 820 based on random allocation.

For example, assuming sequential activation of transmit antennas in the first comparative example, a round-trip time $\tau_i$ for an $i^{th}$ target may be represented as the following Equation 12, for example.

$$\tau_i'(l, t', m, n) = \frac{2[r_i + v_i(t' + (l \cdot M + m)T_p)] + (m \cdot d_{TX} + n \cdot d_{RX})\sin\theta_i}{c} \quad \text{Equation 12}$$

As described above, since (l·M+m)mod M periodically repeats, an index of a transmit antenna may have Doppler ambiguity. When using only a single transmit antenna, the maximum unambiguous measurable velocity range may$_P$ be [$-v_{max}$, $v_{max}$]. In the first comparative example according to Equation 12, $T_P$ may act as a sampling frequency in measuring a velocity. When using M transmit antennas through TDM, a chirp transmission period using the same antenna is M·$T_P$ and the sampling frequency may become 1/M accordingly. Therefore, the maximum measurable velocity range in the first comparative example may decrease by M times of the number of transmit antennas and may be represented as [$-v_{max}$/M, $v_{max}$/M].

In a second comparative example, since transmit antennas are randomly allocated to time slots, noise spread of a component over the entire frequency domain may occur due to a physical interval between the transmit antennas. In the first comparative example, an $m^{th}$ transmit antenna is used in an $m^{th}$ slot of a first chirp sequence. In the second comparative example, a transmit antenna used in an $m^{th}$ slot of an $l^{th}$ chirp may be randomly selected and an index of the selected transmit antenna may be represented as a random variable a(l,m). a(l, m) may refer to an index indicating activation order of the randomly determined transmit antenna, which may be represented as the following Equation 13, for example.

$$\tau''_i(l, t', m, n) = \frac{2[r_i + v_i(t' + (l \cdot M + m)T_p)] + (a(l, m) \cdot d_{TX} + n \cdot d_{RX})\sin\theta_i}{c} \quad \text{Equation 13}$$

A round-trip time $\tau''_i$ for an target in the second comparative example may be calculated according to Equation 13 above, for example. In the second comparative example, Doppler disambiguation may be secured. The maximum unambiguous measurable velocity range may be recovered as $[-v_{max}, v_{max}]$. Here, due to random allocation of transmit antennas to time slots, peaks including a grating lobe may be spread. That is, a noise level may increase.

The electronic device according to one or more embodiments may estimate a Doppler velocity based on SIMO chirp signals that are radiated through the same transmit antenna (e.g., the first transmit antenna element TX1) in the SIMO slots 810. Therefore, the maximum measurable velocity range may appear as [−vmax,vmax]. Also, the electronic device according to one or more embodiments may estimate an angle based on MIMO chirp signals that are radiated through a plurality of transmit antennas in the MIMO slots 820. e electronic device according to one or more embodiments may suppress a noise level mentioned in the second comparative example based on a number and/or a ratio of SIMO slots and MIMO slots. According to an increase in the number of SIMO slots within a single frame, a noise level in a Doppler velocity estimation may decrease and a noise level in an angular estimation may increase. Conversely, according to an increase in the number of MIMO slots, a noise level in a Doppler velocity estimation may increase and a noise level in an angular estimation may decrease.

As another method of resolving Doppler ambiguity, allocation of a MIMO slot based on a variable carrier frequency (VCF) scheme is described.

FIG. 9 illustrates a chirp sequence in which different carrier frequencies are allocated to SIMO slots and MIMO slots.

According to one or more embodiments, a radar sensor of an electronic device may transmit one or more chirp signals generated based on a first carrier frequency $f_{c,1}$ through a single antenna. The radar sensor may transmit other chirp signals generated based on a second carrier frequency $f_{c,2}$ different from the first carrier frequency $f_{c,1}$ through two or more antennas.

For example, referring to FIG. 9, in a chirp sequence 900, the first carrier frequency $f_{c,1}$ may be allocated to SIMO slots 910 and the second carrier frequency $f_{c,2}$ may be allocated to MIMO slots 920. An example of M=12 is described. Here, a zeroth time slot, third to fifth time slots, a seventh time slot, a ninth time slot, and a tenth time slot are set as the SIMO slots 910. Remaining time slots are set as the MIMO slots 920. FIG. 9 illustrates an example in which the first carrier frequency is 80 GHz and the second carrier frequency is 77 GHz. Also, although FIG. 9 illustrates two carrier frequencies, three or more carrier frequencies may be used. The electronic device may transmit a chirp signal of the SIMO slot 910 using one or more carrier frequencies among the plurality of carrier frequencies and may transmit a chirp signal of the MIMO slot 920 using another carrier frequency.

The electronic device according to one or more embodiments may estimate a velocity in which Doppler ambiguity is removed through radiation and sensing of a chirp signal of the SIMO slot 910. For example, similar to FIG. 8, the electronic device may estimate a Doppler velocity with a maximum unambiguous measurable velocity range $[-v_{max}, v_{max}]$.

For reference, in FIG. 9, transmit antenna elements are sequentially allocated to the MIMO slots 920. An $(m+1)^{th}$ transmit antenna element may be allocated to an $m^{th}$ time slot. For example, for the MIMO slots 920, a second transmit antenna element TX2 may be allocated to a first time slot, a third transmit antenna element TX3 may be allocated to a second time slot, a seventh transmit antenna element TX7 may be allocated to a sixth time slot, a ninth transmit antenna element TX9 may be allocated to an eight time slot, and a twelfth transmit antenna element TX12 may be allocated to an eleventh time slot. As described below with reference to FIG. 11, transmit antenna elements may be randomly allocated to the MIMO slots 920. Some transmit antenna elements may be activated in the MIMO slots 920 within a single chirp sequence 900. In this case, the electronic device may activate at least once remaining transmit antenna elements in the MIMO slots 920 of the chirp sequence 900 within the same frame.

The electronic device may allocate a time slot by considering measurable velocity range restoration with respect to a single carrier frequency among a plurality of carrier frequencies and may allocate a time slot by considering an angle measurement with respect to another carrier frequency. Also, the electronic device may expand the maximum measurable velocity range further from $[-v_{max}, v_{max}]$ by combining the random transmit antenna allocation and the VCF described with FIG. 8.

FIG. 10 illustrates an example of processing a radar signal based on a variable carrier frequency (VCF) according to one or more embodiments.

According to one or more embodiments, an electronic device may determine a Doppler velocity by processing a radar signal generated based on a random selection of a transmit antenna and a variable carrier frequency. The electronic device may generate first radar data (e.g., a range-Doppler map 1010) using a SIMO signal based on a first carrier frequency and may generate second radar data (e.g., a range profile 1020) using a MIMO signal based on a second carrier frequency.

For example, the electronic device may acquire the range-Doppler map 1010 based on at least some chirp signals (e.g., the SIMO signal based on the first carrier frequency) and reflected signals of the at least some chirp signals. A processor of the electronic device may acquire the range-Doppler map 1010 by performing a range-based frequency transform and a Doppler frequency-based frequency transform on intermediate frequency data between at least some chirp signals and corresponding reflected signals. The processor of the electronic device may acquire the range profile 1020 based on other chirp signals (e.g., the MIMO signal based on the second carrier frequency) and reflected signals of the other chirp signals. The processor may acquire the range profile 1020 by performing a range-based frequency transform on intermediate frequency data between the other chirp signals and corresponding reflected signals.

For example, when a velocity of a target exceeds [−vmax, vmax], ambiguity may occur due to the ambiguity number q described above in Equation 3. The electronic device may remove the ambiguity of the Doppler velocity by estimating the ambiguity number q. The electronic device may estimate the ambiguity number q in the Doppler velocity by associating first radar data and second radar data. For example, the electronic device may generate the range-Doppler map 1010. Here, a difference between carrier frequencies may be ignored in terms of range. In terms of the Doppler velocity, a bin in which the target is present in the range-Doppler map 1010 may vary depending on a difference between carrier frequencies and a target velocity. The electronic device may estimate the ambiguity number q based on a difference between a Doppler velocity component (e.g., a Doppler frequency) of the target identified from the first radar data (e.g., the range-Doppler map 1010) and a Doppler velocity component of a corresponding target (e.g., a target of a bin present in the same or a similar range) in the second radar data (e.g., the range profile 1020). The electronic device may increase a maximum detection velocity range by determining an accurate velocity based on the ambiguity number q. A non-limiting example of estimation of the ambiguity number q is described with reference to FIG. 11.

Therefore, the electronic device of one or more embodiments may further increase the measurable velocity range by calculating a Doppler bin difference for the same target for each carrier frequency based on chirp signals using different carrier frequencies. The electronic device of one or more embodiments may measure a velocity exceeding the maximum velocity range [−vmax,vmax], which is measurable through a single transmit antenna, without ambiguity.

Figure 11:
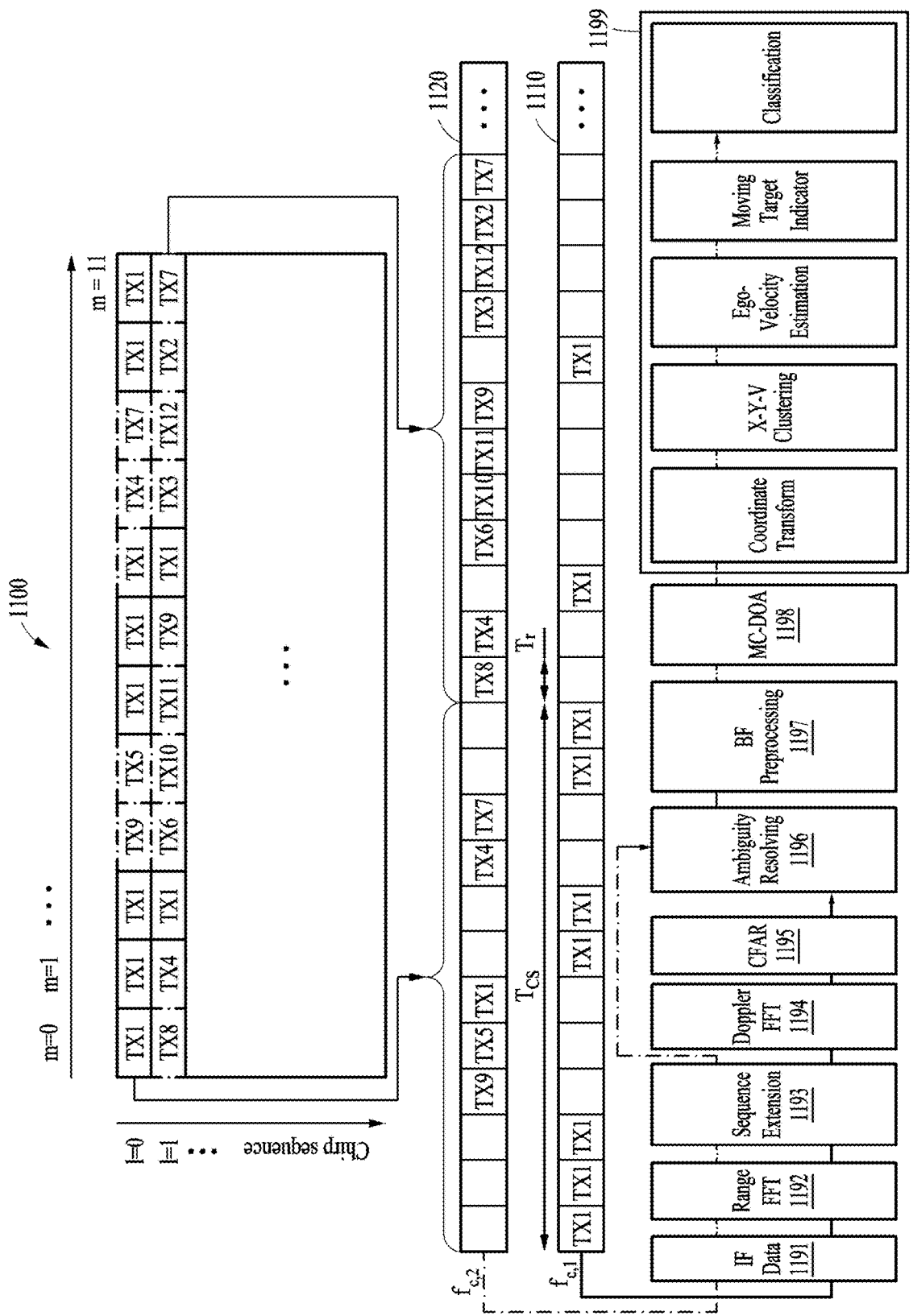
FIG. 11 illustrates an operation of determining a range of a target, a Doppler velocity, and a direction of arrival (DOA) from chirp sequences and SIMO data and MIMO data based on random TX transmission and VCF according to one or more embodiments.

FIG. 11 illustrates an operation of determining a range of a target, a Doppler velocity, and a DOA from chirp sequences and SIMO data and MIMO data based on random TX transmission and VCF according to one or more embodiments.

An electronic device according to one or more embodiments may transmit a radar signal that includes a plurality of chirp sequences 1100. In the example of FIG. 11, the electronic device may transmit the radar signal that includes L chirp sequences 1100. Each chirp sequence may include M time slots. FIG. 11 illustrates an example of a chirp sequence of l=0 and a chirp sequence of l=1. In SIMO slots 1110, chirp signals are transmitted through a first transmit antenna element TX1 using a first carrier frequency $f_{c,1}$. In MIMO slots 1120, chirp signals are transmitted through a plurality of transmit antenna elements using a second carrier frequency $f_{c,2}$. In FIG. 11, in the MIMO slots 1120, the transmit antennas may be activated in order of TX9, TX5, TX1, TX4, and TX7 for the chirp sequence of l=0 and may be activated in order of TX8, TX4, TX6, TX10, TX11, TX9, TX3, TX12, TX2, and TX7 for the chirp sequence of l=1.

A radar sensor according to one or more embodiments may transmit one or more chirp signals generated based on a first carrier frequency through a single antenna. The radar sensor may transmit a corresponding chirp signal through a transmit antenna that is randomly determined for a time slot randomly selected from a single chirp sequence within the same frame, with respect to each of other chirp signals that are generated based on a second carrier frequency different from the first carrier frequency.

In operation 1191, the electronic device may acquire an intermediate frequency signal based on a radar transmission signal and a radar reception signal. The electronic device may acquire a first intermediate frequency signal for a SIMO chirp signal based on the first carrier frequency and may acquire a second intermediate frequency signal for a MIMO chirp signal based on the second carrier frequency. The electronic device may individually process the first intermediate frequency signal and the second intermediate frequency signal in the following operations.

In operation 1192, the electronic device may perform a range-based frequency transform. The electronic device may perform the range-based frequency transform on each of the first intermediate frequency signal and the second intermediate frequency signal.

In operation 1193, the electronic device may rearrange data through sequence extension.

In operation 1194, the electronic device may perform a Doppler frequency-based frequency transform on data based on the first intermediate frequency signal. Therefore, the electronic device may acquire a range-Doppler map by performing the range-based frequency transform and the Doppler frequency-based frequency transform on first intermediate frequency data between a SIMO signal and a corresponding reflected signal.

On the contrary, the electronic device may exclude the Doppler frequency-based frequency transform for data based on the second intermediate frequency signal. That is, the processor of the electronic device may skip the Doppler frequency-based frequency transform on other chirp signals (e.g., a MIMO chirp signal).

In operation 1195, the processor of the electronic device may detect a target based on the range-Doppler map. For example, the electronic device may detect the target by applying a CFAR to the first radar data (e.g., the range-Doppler map).

In operation 1196, the electronic device may resolve ambiguity of a Doppler velocity. For example, the electronic device may acquire an estimated first ambiguous Doppler velocity $f_{D1,amb}$ based on the first carrier frequency for the target from the first radar data. The electronic device may acquire an estimated second ambiguous Doppler velocity $f_{D2,amb}$ based on the second carrier frequency for the same target from the second radar data. The electronic device may select a target having a range identical or similar to the target identified from the first radar data from the second radar data. Since a range difference hardly occurs in the same frame, it may be assumed that the target identified from the first radar data and the target identified from the second radar data are identical to each other.

$$f_{D,max} = \frac{f_r}{2} = 1/(2T_p) \qquad \text{Equation 14}$$

The electronic device may calculate a maximum estimable Doppler frequency $f_{D,max}$ according to Equation 14 above, for example.

$$v = -\Delta f_d \cdot c/(2f_{shift}) \qquad \text{Equation 15:}$$

The electronic device may calculate the Doppler velocity v according to Equation 15 above, for example. For reference, the electronic device may calculate a Doppler frequency difference $\Delta f_D$ between the first ambiguous Doppler velocity $f_{D1,amb}$ and the second ambiguous Doppler velocity $f_{D2,amb}$ according to the following Table 1, for example.

TABLE 1

| Sign | Numerical Relationship | Doppler Frequency Difference | Velocity | Case |
|---|---|---|---|---|
| $f_{D1, amb} \geq 0$ | $f_{D1, amb} \leq f_{D2, amb}$ | $q_2 = q_1, \Delta f_D = f_{D2, amb} - f_{D1, amb}$ | $v \leq 0$ | 1 |
| $f_{D2, amb} \geq 0$ | $f_{D1, amb} > f_{D2, amb}$ | $q_2 = q_1, \Delta f_D = f_{D2, amb} - f_{D1, amb}$ | $v > 0$ | 2 |
| $f_{D1, amb} < 0$ | $f_{D1, amb} < f_{D2, amb}$ | $q_2 = q_1, \Delta f_D = f_{D2, amb} - f_{D1, amb}$ | $v < 0$ | 3 |
| $f_{D2, amb} \leq 0$ | $f_{D1, amb} \geq f_{D2, amb}$ | $q_2 = q_1, \Delta f_D = f_{D2, amb} - f_{D1, amb}$ | $v > 0$ | 4 |
| $f_{D1, amb} \geq 0$ | $f_{D1, amb} - f_{D2, amb} > f_{D, max}$ | $q_2 = q_1, + 1, \Delta f_D = f_{D2, amb} + 2f_{D, max} - f_{D1, amb}$ | $v < 0$ | 5 |
| $f_{D2, amb} \leq 0$ | $f_{D1, amb} - f_{D2, amb} < f_{D, max}$ | $q_2 = q_1, \Delta f_D = f_{D2, amb} - f_{D1, amb}$ | $v > 0$ | 6 |
| $f_{D1, amb} \leq 0$ | $f_{D2, amb} - f_{D1, amb} > f_{D, max}$ | $q_2 = q_1, + 1, \Delta f_D = f_{D2, amb} + (-2f_{D, max}) - f_{D1, amb}$ | $v > 0$ | 7 |
| $f_{D2, amb} \geq 0$ | $f_{D2, amb} - f_{D1, amb} < f_{D, max}$ | $q_2 = q_1, \Delta f_D = f_{D2, amb} - f_{D1, amb}$ | $v < 0$ | 8 |

Here, in the above Table 1, $q_1$ may be represented as q in the following Equation 17, for example.

$$f_{shift} = f_{c,1} - f_{c,1},\quad \text{Equation 16:}$$

where $$f_{c,1} > f_{c,2}$$

A frequency shift $f_{shift}$ of Equation 15 may be calculated according to Equation 16 above, for example.

$$f_{D1} = f_{D1,amb} + q(2f_{D,max}) \quad \text{Equation 17:}$$

The Doppler frequency component in which the ambiguity of the target is removed may be represented as Equation 17 above, for example.

$$q = \text{round}\left\{\frac{d_{D1,u} - f_{D1,amb}}{2f_{D,max}}\right\} \quad \text{Equation 18}$$

$$f_{D1,u} = -2\frac{v}{c}f_{c,1} \quad \text{Equation 19}$$

The ambiguity number q may be calculated according to Equation 18 and Equation 19 above, for example.

$$v_r = \frac{c \cdot f_{D1}}{2f_{c,1}} \quad \text{Equation 20}$$

The electronic device may calculate a radial velocity for the target based on Equation 20 above, for example. Since the ambiguity number q is considered in Equation 17, the ambiguity may be removed in Equation 20.

In operation 1197, the electronic device may perform beamforming (BF) preprocessing. For example, the electronic device may compensate for a value according to beamforming applied to compensate for an error by an interval between transmit antennas.

In operation 1198, the electronic device may determine a DOA of the target. For example, the electronic device may determine a DOA for each detected target by processing other chirp signals (e.g., MIMO chirp signal) based on a target that is detected based on the range-Doppler map (e.g., first radar data) acquired by processing at least some chirp signals (e.g., SIMO chirp signal). The processor of the electronic device may maintain a range, a Doppler velocity, and an angle (e.g., a horizontal angle and a vertical angle) for each target detected in each frame.

For reference, the electronic device may maintain only values related to the target and may discard the rest. For example, after the Doppler ambiguity is resolved in operation 1196, the electronic device may discard the first radar data (e.g., the range-Doppler map) acquired based on SIMO. The electronic device may determine a DOA for each target from the second radar data that is acquired based on MIMO for the target identified from the first radar data. Accordingly, when the electronic device stores a range value, a Doppler velocity value, and an angle value for each target, the electronic device may maintain result data that includes (a number of targets)×3 values. When the range value, the Doppler velocity value, azimuth, and elevation angle are stored for each target, the electronic device may maintain result data that includes (a number of targets)×4 values. Therefore, the electronic device of one or more embodiments may significantly save a memory and a computational amount compared to a typical example of maintaining the range-Doppler map.

In operation 1199, the electronic device may perform various operations using the result data. In the example of FIG. 11, the electronic device may transform the result data to a coordinate system of the target. For example, the electronic device may transform a range value, a Doppler velocity value, and an angle value of the target to coordinates according to a cartesian coordinate system. The electronic device may perform clustering based on coordinate values. The electronic device may estimate an ego-velocity (e.g., a velocity of a vehicle to which the electronic device is mounted) based on coordinate values and velocity values for each target. The electronic device may identify a moving object. The electronic device may classify a surrounding object.

For example, the electronic device may be mounted to a vehicle (e.g., an autonomous vehicle, an airplane, and a ship). The processor of the electronic device may generate a surrounding environment map based on radar processing results that include any one or any combination of any two or more of a range, a Doppler velocity, and a DOA calculated from radar data. The electronic device may control either one or both of a steering and a velocity of the vehicle using the generated surrounding environment map.

Figure 12:
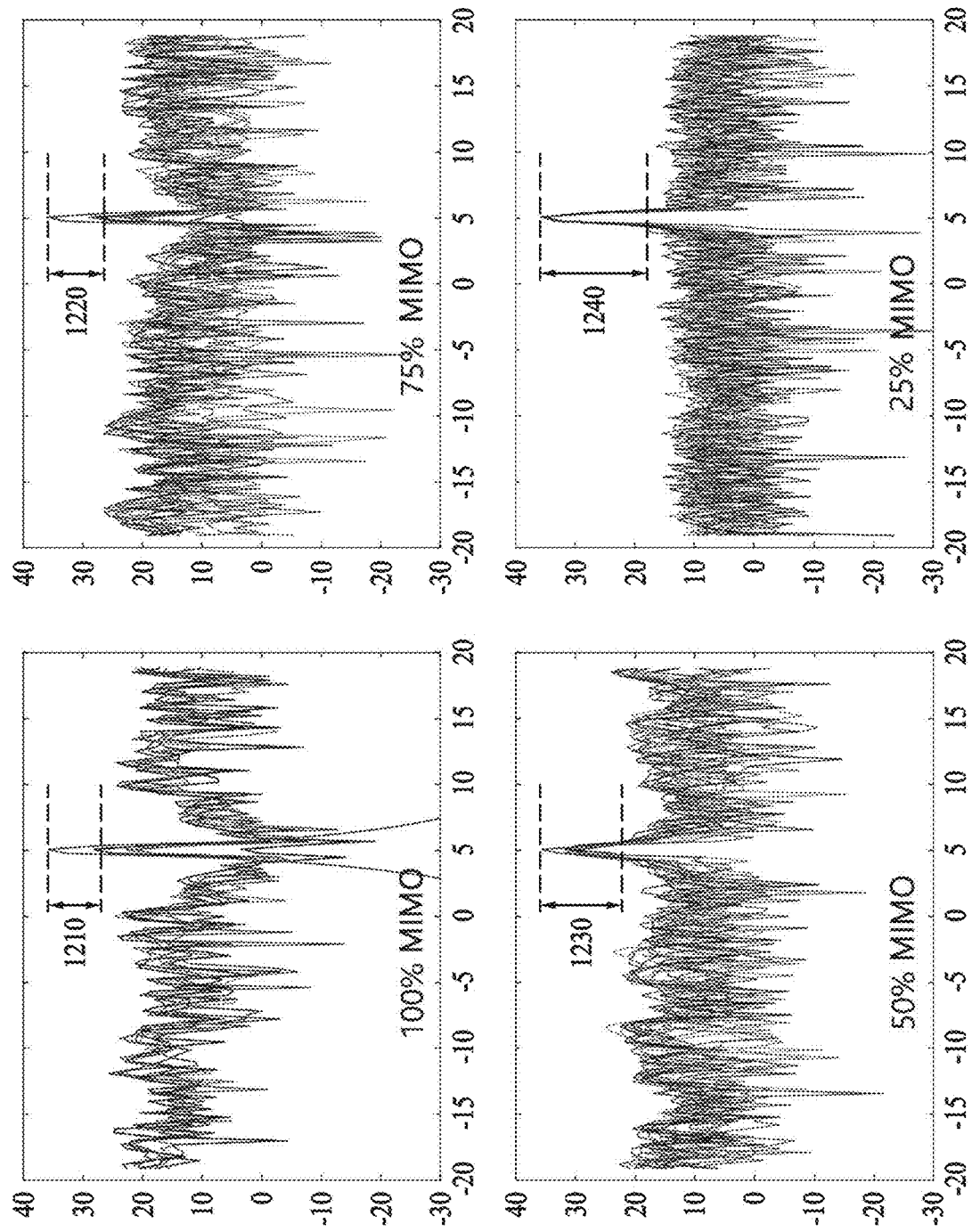
FIGS. 12 and 13 are graphs showing a tradeoff by coexistence of a SIMO slot and a MIMO slot according to one or more embodiments.
Figure 13:
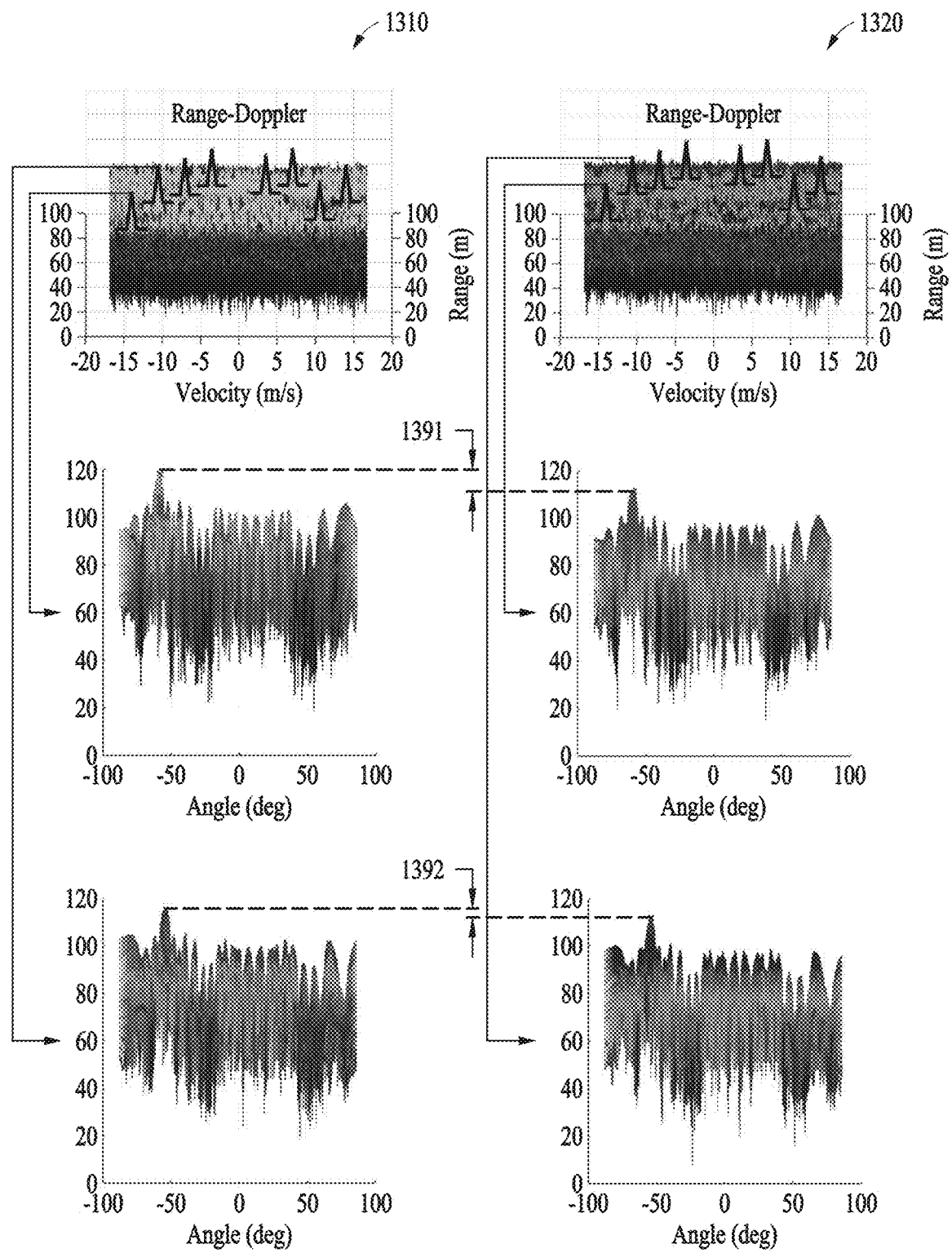

FIGS. 12 and 13 are graphs showing a tradeoff by coexistence of a SIMO slot and a MIMO slot according to one or more embodiments.

According to one or more embodiments, an electronic device may adjust a number and/or a ratio of SIMO slots and MIMO slots in a single frame. According to an increase in the number of SIMO slots, a peak-to-sidelobe gap may be improved in a Doppler profile. According to an increase in the number of MIMO slots, a peak-to-sidelobe gap may be improved in an angular profile. Here, since a gap improvement width in the angular profile is relatively lower than an increase in the ratio of MIMO slots, increasing the ratio of MIMO slots may be interpreted as low efficiency. Therefore, increasing the ratio of SIMO slots may be advantageous in terms of signal-to-ratio (SNR) improvement. FIG. 12 illustrates examples of a noise level in terms of a Doppler velocity as the Doppler profile. A horizontal axis of the Doppler profile represents a Doppler velocity and a vertical axis represents a signal intensity. FIG. 12 illustrates a peak-to-sidelobe gap 1210 when a ratio of MIMO slots in a single frame is 100%, a peak-to-sidelobe gap 1220 when the ratio of MIMO slots is 75%, a peak-to-sidelobe gap 1230 when the ratio of MIMO slots is 50%, and a peak-to-sidelobe gap 1240 when the ratio of MIMO slots is 25%. Referring to FIG. 12, according to a decrease in the number of MIMO slots, it may be interpreted that it is easy to distinguish the Doppler velocity.

FIG. 13 illustrates examples of an angular profile for each target in a simple MIMO-based range-Doppler map 1310 in which a hybrid chirp is not used. A horizontal axis of the range-Doppler map 1310 represents a Doppler velocity and a vertical axis represents a range. In a Doppler map 1320 in which the hybrid chirp is used, reduced signal intensities 1391 and 1392 for the same target appear. Here, since a noise level compared to a peak-to-noise gap significantly decreases, peak identification may be simplified.

An electronic device according to one or more embodiments may generate a radar signal with a ratio of time slots for MIMO in the same frame greater than 0 and less than 1. The ratio of time slots for MIMO may be a ratio of a number of MIMO slots to a total number of time slots in a singe frame. The electronic device may generate a radar signal with a ratio of time slots for MIMO in the same frame greater than 0 and less than or equal to 0.75. The electronic device may generate a radar signal with a ratio of time slots for MIMO within the same frame greater than 0 and less than or equal to 0.5. For reference, improvement of range estimation performance according to an increase in a number of SIMO slots may be evaluated to be relatively greater than degradation of angular estimation performance according to a decrease in the number of MIMO slots. The electronic device may generate a radar signal with a ratio of time slots for MIMO within the same frame greater than 0 and less than or equal to 0.25.

As described above, the electronic device according to one or more embodiments may significantly decrease a computational amount of a Doppler aspect in terms of signal processing through a hybrid chirp. Since a noise level decreases in terms of velocity, the electronic device according to one or more embodiments may easily resolve an association problem between radar data based on different carrier frequencies.

Figure 14:
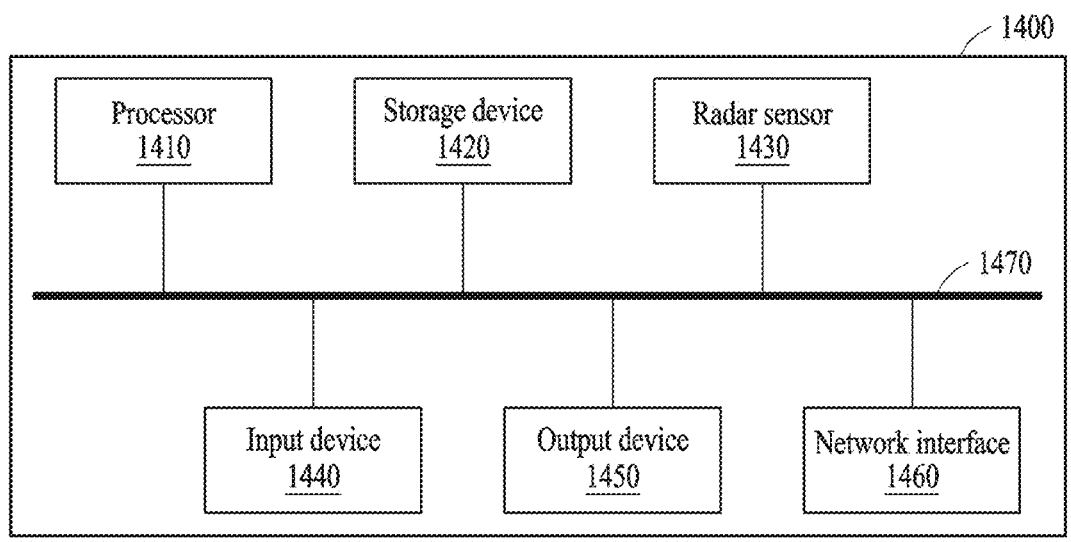
FIG. 14 is a diagram illustrating an electronic device according to one or more embodiments.

FIG. 14 is a diagram illustrating an electronic device according to one or more embodiments.

Referring to FIG. 14, an electronic device 1400 may perform the aforementioned radar signal processing method. The electronic device 1400 may perform any one, any combination, or all of the operations and methods described above with reference to FIGS. 1 to 13. For example, the electronic device 1400 may be or include the radar signal processing device 400 of FIG. 4. The electronic device 1400 may be or include, for example, an image processing device, a smartphone, a wearable device, a tablet computer, a netbook, a laptop, a desktop, a personal digital assistant (PDA), a head mounted display (HMD), a vehicle (e.g., an autonomous vehicle), and/or a driving assistance device mounted to the vehicle.

Referring to FIG. 14, the electronic device 1400 may include a processor 1410 (e.g., one or more processors), a storage device 1420 (e.g., including one or more memories), a radar sensor 1430, an input device 1440, an output device 1450, and a network interface 1460. The processor 1410, the storage device 1420, the radar sensor 1430, the input device 1440, the output device 1450, and the network interface 1460 may communicate with each other through a communication bus 1470.

The processor 1410 may execute a function and instructions for execution in the electronic device 1400. For example, the processor 1410 may process instructions stored in the storage device 1420. The processor 1410 may perform any one, any combination, or all of the operations and methods described above with reference to FIGS. 1 to 13. The processor 1410 may be or include the signal processor 420 of FIG. 4.

The storage device 1420 stores information and data required for execution of the processor 1410. The storage device 1420 may include a non-transitory computer-readable storage medium or a non-transitory computer-readable storage device. The storage device 1420 may store instructions for execution by the processor 1410, and may store related information while software or application is being executed by the electronic device 1400.

The radar sensor 1430 may transmit radar signals of a plurality of frames and may receive a reflected signal. The radar sensor 1430 may transmit at least some chirp signals among a plurality of chirp signals belonging to the same frame through a single antenna among a plurality of antennas. The radar sensor 1430 may radiate a radar signal by transmitting other chirp signals through at least two antennas among the plurality of antennas. The radar sensor 1430 may include a plurality of transmit antenna elements and a plurality of receive antenna elements. The radar sensor 1430 may be or include the radar sensor 410 of FIG. 4.

The input device 1440 may receive an input from a user through a haptic, a video, an audio, or a touch input. The input device 1440 may include another device capable of detecting an input from a keyboard, a mouse, a touchscreen, a microphone, or a user, and transmitting the detected input.

The output device 1450 may provide the output of the electronic device 1400 to the user through a visual, an auditory, or a haptic channel. The output device 1450 may include, for example, a display, a touchscreen, a speaker, a vibration generation device, or another device capable of providing the output to the user. The network interface 1460 may communicate with an external device through a wired network or a wireless network. According to one or more embodiments, the output device 1450 may provide results of processing radar data and the like to the user using any one or any combination of any two or more of visual information, auditory information, and haptic information.

For example, when the electronic device 1400 is mounted to the vehicle, the electronic device 1400 may visualize a radar image map through a display. As another example, the electronic device 1400 may change any one or any combination of any two or more of velocity, an acceleration, and steering of the vehicle to which the electronic device 1400 is mounted, based on DOA information, range information, and/or the radar image map. However, without being limited thereto, the electronic device 1400 may perform the functionality of ACC, AEB, BSD, LCA, and ego-localization. The electronic device 1400 may structurally and/or functionally include a control system for controlling the vehicle.

The electronic device 1400 may be implemented as an advanced assistance system that supports driving for safety and convenience of a driver and risk avoidance through various types of sensors embedded inside and outside an ADAS. The electronic device 1400 according to one or more embodiments may have a further wider range of Doppler velocity measurement by driving a vehicle radar and by resolving ambiguity of Doppler velocity. The electronic device 1400 may perform a velocity coupling correction when estimating an ego-velocity, a posture, and a DOA of a platform to which a radar is mounted. The electronic device 1400 may apply to the radar for vehicle and may operate in each radar sensor.

The electronic device 1400 according to one or more embodiments may radiate a radar signal in which SIMO and MIMO are mixed by transmitting some chirp signals among chirp signals of a single frame through a single transmit antenna and by transmitting remaining chirp signals through a plurality of transmit antennas. The electronic device 1400 according to one or more embodiments may realize Doppler disambiguation through a mixture of SIMO and MIMO, may detect a wider range of maximum velocity, and may achieve simplification in a computational amount and improvement in accuracy.

The radar signal processing devices, radar sensors, chirp transmitters, transmit antennas, receive antennas, frequency mixers, amplifiers, radar signal processors, signal processors, transmitters, receivers, hybrid chirp generators, electronic devices, processors, storage devices, input devices, output devices, network interfaces, communication buses, radar signal processing device 110, radar sensor 111, radar sensor 210, chirp transmitter 211, transmit antenna 212, receive antenna 213, frequency mixer 214, amplifier 215, radar signal processor 216, radar signal processing device 400, radar sensor 410, signal processor 420, transmitter 411, receiver 412, hybrid chirp generator 421, electronic device 1400, processor 1410, storage device 1420, radar sensor 1430, input device 1440, output device 1450, network interface 1460, communication bus 1470, and other apparatuses, units, modules, devices, and components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An electronic device comprising:
    a radar sensor configured to radiate a radar signal and receive a reflected signal of the radiated radar signal by:
        transmitting one or more chirp signals among a plurality of chirp signals belonging to the same frame through a single antenna among a plurality of antennas of the radar sensor; and
        transmitting other chirp signals among the plurality of chirp signals belonging to the same frame through at least two antennas among the plurality of antennas; and
    one or more processors configured to detect a target and determine a direction of arrival (DOA) of the target from radar data determined based on the one or more chirp signals, the other chirp signals, and the reflected signal,
    wherein the radar sensor is configured to:
        for the transmitting of the one or more chirp signals, transmit the one or more chirp signals generated based on a first carrier frequency, through the single antenna; and
        for the transmitting of the other chirp signals, transmit the other chirp signals generated based on a second carrier frequency different from the first carrier frequency, through the at least two antennas.

2. The electronic device of claim 1, wherein, for the transmitting of the other chirp signals, the radar sensor is configured to transmit each of the other chirp signals in a single chirp sequence within the same frame.

3. The electronic device of claim 1, wherein, for the transmitting of the other chirp signals, the radar sensor is configured to transmit a corresponding chirp signal through a transmit antenna randomly determined in a timeslot selected for each of the other chirp signals in a single chirp sequence within the same frame.

4. The electronic device of claim 3, wherein the radar sensor is configured to transmit a chirp signal for multiple input multiple output (MIMO) by activating all the transmit antennas in the same frame at least once.

5. The electronic device of claim 1, wherein, for the transmitting of the other chirp signals, the radar sensor is configured to transmit a corresponding chirp signal through a transmit antenna randomly determined in a timeslot randomly selected in a single chirp sequence within the same frame for each of the other chirp signals.

6. The electronic device of claim 1, wherein the one or more processors are configured to determine a range-Doppler map, comprised in the radar data, based on the one or more chirp signals and respective reflected signals of the one or more chirp signals.

7. The electronic device of claim 6, wherein, for the determining of the range-Doppler map, the one or more processors are configured to determine the range-Doppler map by performing a range-based frequency transform and a Doppler frequency-based frequency transform on intermediate frequency data between the one or more chirp signals and the respective reflected signals.

8. The electronic device of claim 6, wherein, for the detecting of the target, the one or more processors are configured to detect the target based on the range-Doppler map.

9. The electronic device of claim 1, wherein the one or more processors are configured to determine a range profile, comprised in the radar data, based on the other chirp signals and reflected signals of the other chirp signals.

10. The electronic device of claim 9, wherein, for the determining of the range profile, the one or more processors are configured to determine the range profile by performing a range-based frequency transform on intermediate frequency data based on the other chirp signals and the reflected signals of the other chirp signals.

11. The electronic device of claim 1, wherein the one or more processors are configured to skip a Doppler frequency-based frequency transform on the other chirp signals.

12. The electronic device of claim 1, wherein, for the determining of the DOA, the one or more processors are configured to determine a DOA for each detected target by processing the other chirp signals based on a target that is detected based on a range-Doppler map determined by processing the one or more chirp signals.

13. The electronic device of claim 1, wherein the one or more processors are configured to maintain a range, a Doppler velocity, and an angle for each target detected in each frame.

14. The electronic device of claim 1, wherein a ratio of time slots for multiple input multiple output (MIMO) within the same frame is greater than 0 and less than or equal to 0.5.

15. An electronic device comprising:
    a radar sensor configured to radiate a radar signal and receive a reflected signal of the radiated radar signal by:
        transmitting one or more chirp signals among a plurality of chirp signals belonging to the same frame through a single antenna among a plurality of antennas of the radar sensor; and transmitting other chirp signals among the plurality of chirp signals belonging to the same frame through at least two antennas among the plurality of antennas; and one or more processors configured to detect a target and determine a direction of arrival (DOA) of the target from radar data determined based on the one or more chirp signals, the other chirp signals, and the reflected signal, wherein each of a plurality of chirp sequences included in the same frame includes the same number of time slots as a number of transmit antennas included in the radar sensor.

16. The electronic device of claim 1, wherein one of the at least two antennas for multiple input multiple output (MIMO) is the same antenna as the single antenna for single input multiple output (SIMO).

17. The electronic device of claim 1, wherein the electronic device is configured to mount to a vehicle, and the one or more processors are configured to:
    generate a surrounding environment map based on radar processing results including any one or any combination of any two or more of a range, a Doppler velocity, and the DOA determined from the radar data; and
    control either one or both of a steering and a velocity of the vehicle using the generated surrounding environment map.

18. A processor-implemented method with radar signal processing, the method comprising:

transmitting one or more chirp signals among a plurality of chirp signals belonging to the same frame through a single antenna among a plurality of antennas;

transmitting other chirp signals among the plurality of chirp signals belonging to the same frame through at least two antennas among the plurality of antennas; and detecting a target and determining a direction of arrival (DOA) of the target from radar data determined based on the one or more chirp signals, the other chirp signals, and a reflected signal, wherein the transmitting of the one or more chirp signals includes transmitting the one or more chirp signals generated based on a first carrier frequency, through the single antenna, and wherein the transmitting of the other chirp signals includes transmitting the other chirp signals generated based on a second carrier frequency different from the first carrier frequency, through the at least two antennas.

19. A non-transitory computer-readable storage medium storing instructions that, when executed by one or more processors, configure the one or more processors to perform the method of claim 18.

* * * * *